(12) United States Patent
Shi

(10) Patent No.: US 11,892,605 B2
(45) Date of Patent: Feb. 6, 2024

(54) CAMERA OPTICAL LENS

(71) Applicant: AAC Optics (Suzhou) Co., Ltd., Suzhou (CN)

(72) Inventor: Rongbao Shi, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 487 days.

(21) Appl. No.: 17/138,826

(22) Filed: Dec. 30, 2020

(65) Prior Publication Data

US 2022/0066169 A1 Mar. 3, 2022

(30) Foreign Application Priority Data

Sep. 3, 2020 (CN) .......................... 202010918113.5

(51) Int. Cl.
G02B 13/00 (2006.01)
G02B 9/62 (2006.01)

(52) U.S. Cl.
CPC ........... *G02B 13/0045* (2013.01); *G02B 9/62* (2013.01)

(58) Field of Classification Search
CPC ... G02B 3/02; G02B 9/62; G02B 9/64; G02B 13/0045; G02B 15/146; G02B 27/0025; H04N 5/222; H04N 5/2254; H04N 23/55
USPC ......... 359/656–658, 708, 713, 749, 756–762
See application file for complete search history.

(56) References Cited

U.S. PATENT DOCUMENTS

2018/0321468 A1* 11/2018 Shih .................... G02B 9/50
2020/0116980 A1* 4/2020 Chen .................. G02B 13/0045

FOREIGN PATENT DOCUMENTS

| CN | 107092082 A | * | 8/2017 | ......... G02B 13/0045 |
| CN | 109270664 A | * | 1/2019 | ......... G02B 13/0045 |
| CN | 109581627 A | * | 4/2019 | ......... G02B 13/0045 |
| CN | 111308667 A | * | 6/2020 | ......... G02B 13/0045 |
| JP | 6687819 B1 | * | 4/2020 | ......... G02B 13/0015 |

* cited by examiner

*Primary Examiner* — Stephone B Allen
*Assistant Examiner* — Daniel Jeffery Jordan
(74) *Attorney, Agent, or Firm* — W&G Law Group

(57) ABSTRACT

A camera optical lens includes, from an object side to an image side: a first lens having a positive refractive power, a second lens having a negative refractive power, a third lens, a fourth lens, a fifth lens having a positive refractive power and a sixth lens having a negative refractive power. The camera optical lens satisfies following conditions: 0.25≤d10/TTL≤0.50 and 0.55≤f1/f≤1.00, here f denotes a focal length of the camera optical lens, f1 denotes a focal length of the first lens, d10 denotes an on-axis thickness from an image-side surface of the fifth lens to an object-side surface of the sixth lens, and TTL denotes a total optical length from an object-side surface of the first lens to an image surface of the camera optical lens along an optical axis. The camera optical lens has excellent optical performances such as a large aperture, a wide angle and ultra-thin etc..

9 Claims, 10 Drawing Sheets

CAMERA OPTICAL LENS

TECHNICAL FIELD

The present disclosure relates to the field of optical lenses, particular, to a camera optical lens suitable for handheld devices, such as smart phones and digital cameras, and imaging devices, such as monitors or PC lenses.

BACKGROUND

With the emergence of smart phones in recent years, the demand for miniature camera lenses is increasing day by day, but in general the photosensitive devices of camera lenses are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become-mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece and six-piece lens structure gradually appear in lens designs. Although the six-piece lens already has good optical performance, its focal power, lens spacing and lens shape are still unreasonable, resulting in the lens structure still cannot meet the design requirements of a large aperture, ultra-thin and a wide angle while having good optical performance.

SUMMARY

In view of above problems, an objective of the present disclosure is to provide a camera optical lens, which has excellent optical performances, and meanwhile can meet design requirements of a large aperture, a wide angle and ultra-thin.

To solve the above problems, some embodiments of the present disclosure is to provides a camera optical lens including, from an object side to an image side, a first lens having a positive refractive power, a second lens having a negative refractive power, a third lens, a fourth lens, a fifth lens having a positive refractive power, and a sixth lens having a negative refractive power.

The camera optical lens satisfies following conditions: $0.25 \leq d10/TTL \leq 0.50$, and $0.55 \leq f1/f \leq 1.00$. Herein f denotes a focal length of the camera optical lens, f1 denotes a focal length of the first lens, d10 denotes an on-axis thickness from an image-side surface of the fifth lens to an object-side surface of the sixth lens, and TTL denotes a total optical length from an object-side surface of the first lens to an image surface of the camera optical lens along an optical axis.

Preferably, the camera optical lens further satisfying following condition: $-2.10 \leq f2/f \leq -1.00$, Herein f2 denotes a focal length of the second lens.

Preferably, the camera optical lens further satisfying following condition: $-3.00 \leq R10/R9 \leq -1.00$. Herein R9 denotes a curvature radius of an object-side surface of the fifth lens, and R10 denotes a curvature radius of an image-side surface of the fifth lens.

Preferably, the camera optical lens further satisfying following conditions: $-1.01 \leq (R1+R2)/(R1-R2) \leq 0.27$ and $0.03 \leq d1/TTL \leq 0.10$. Herein R1 denotes a curvature radius of the object-side surface of the first lens, R2 denotes a curvature radius of an image-side surface of the first lens, and d1 denotes an on-axis thickness of the first lens.

Preferably, the camera optical lens further satisfying following conditions: $1.60 \leq (R3+R4)/(R3-R4) \leq 6.07$ and $0.01 \leq d3/TTL \leq 0.05$. Herein R3 denotes a curvature radius of an object-side surface of the second lens, R4 denotes a curvature radius of an image-side surface of the second lens, and d3 denotes an on-axis thickness of the second lens.

Preferably, the camera optical lens further satisfying following conditions: $-2.50 \leq f3/f \leq 20.33$, $-3.68 \leq (R5+R6)/(R5-R6) \leq 17.54$, and $0.01 \leq d5/TTL \leq 0.06$. Herein f3 denotes a focal length of the third lens, R5 denotes a curvature radius of an object-side surface of the third lens, R6 denotes a curvature radius of an image-side surface of the third lens, and d5 denotes an on-axis thickness of the third lens.

Preferably, the camera optical lens further satisfying following conditions: $-25.39 \leq f4/f \leq 88.25$, $-354.59 \leq (R7+R8)/(R7-R8) \leq 30.09$, and $0.01 \leq d7/TTL \leq 0.05$. Herein f4 denotes a focal length of the fourth lens, R7 denotes a curvature radius of an object-side surface of the fourth lens, R8 denotes a curvature radius of an image-side surface of the fourth lens, and d7 denotes an on-axis thickness of the fourth lens.

Preferably, the camera optical lens further satisfying following conditions: $0.37 \leq f5/f \leq 1.40$, $-0.98 \leq (R9+R10)/(R9-R10) \leq -0.02$, and $0.02 \leq d9/TTL \leq 0.11$. Herein f5 denotes a focal length of the fifth lens, R9 denotes a curvature radius of an object-side surface of the fifth lens, R10 denotes a curvature radius of an image-side surface of the fifth lens, and d9 denotes an on-axis thickness of the fifth lens.

Preferably, the camera optical lens further satisfying following conditions: $-1.82 \leq f6/f \leq -0.50$, $-0.35 \leq (R11+R12)/(R11-R12) \leq 0.47$, and $0.08 \leq d11/TTL \leq 0.31$. Herein f6 denotes a focal length of the sixth lens, R11 denotes a curvature radius of an object-side surface of the sixth lens, R12 denotes a curvature radius of an image-side surface of the sixth lens, and d11 denotes an on-axis thickness of the sixth lens.

Preferably, the camera optical lens further satisfying following condition: $TTL/IH \leq 1.88$. Herein IH denotes an image height of the camera optical lens.

Advantageous effects of the present disclosure are that, the camera optical lens has excellent optical performances, and also has a large aperture, a wide angle, and is ultra-thin. The camera optical lens is especially suitable for mobile camera lens components and WEB camera lens composed of high pixel CCD, CMOS.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art should understand that, in the embodiments of the present disclosure, many technical details are provided to make readers better understand the present disclosure. However, even without these technical details and any changes and modifications based on the following embodiments, technical solutions required to be protected by the present disclosure may be implemented.

Embodiment 1

Figure 1:
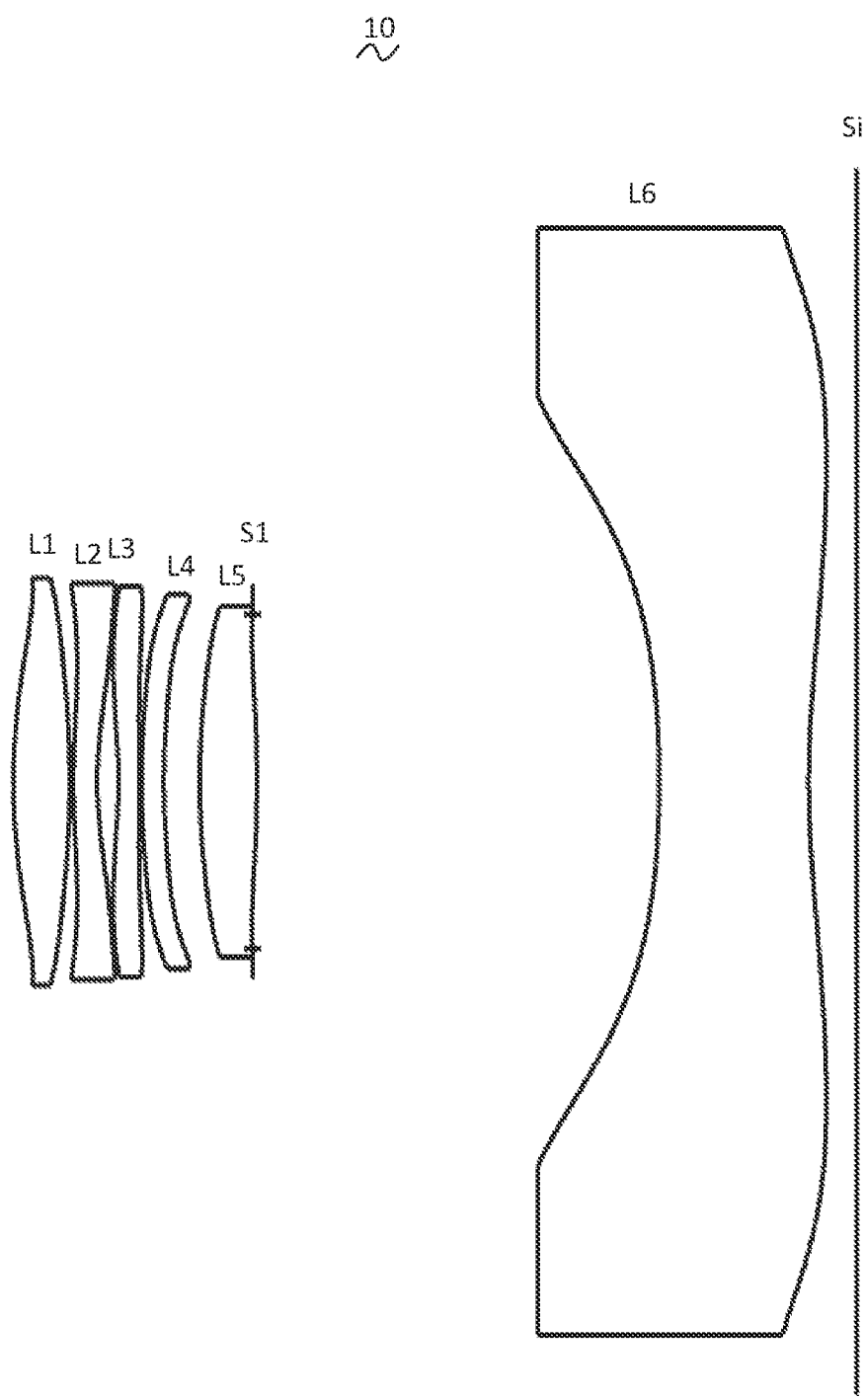
FIG. 1 shows a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, the camera optical lens 10 includes six lenses. Specifically, the camera optical lens 10 includes, from an object side to an image side: a first lens L1, a second lens L2, a third lens L3, a fourth lens L4, a fifth lens L5, an aperture Si, and a sixth lens L6, the sixth lens L6 is spaced apart from an image surface Si. In the embodiment, the first lens L1 has a positive refractive power, the second lens L2 has a negative refractive power, the third lens L3 has a negative refractive power, the fourth lens L4 has a negative refractive power, the fifth lens L5 has a positive refractive power, and the sixth lens L6 has a negative refractive power.

In the embodiment, the first lens L1, the second lens L2, the third lens L3, the fourth lens L4, the fifth lens L5, and the sixth lens L6 are all made of plastic material.

Herein, a focal length of the camera optical lens 10 is defined as f, a focal length of the first lens L1 is defined as f1, an on-axis thickness from an image-side surface of the fifth lens L5 to an object-side surface of the sixth lens L6 is defined as d10, a total optical length from an object-side surface of the first lens L1 to an image surface of the camera optical lens 10 along an optical axis is defined as TTL, and the camera optical lens 10 should satisfy following conditions:

$$0.25 \leq d10/TTL \leq 0.50 \quad (1); \text{ and}$$

$$0.55 \leq f1/f \leq 1.00 \quad (2).$$

Herein when d10/TTL satisfies the condition, which can effectively distribute the air separation distance between the fifth lens L5 and the sixth lens L6 (that is, the on-axis thickness d10 from the image-side surface of the fifth lens to the object-side surface of the sixth lens), thereby facilitating lens assembly.

The condition (2) specifies the ratio of the focal length f1 of the first lens L1 to the focal length f of the camera optical lens 10, within this range, it is beneficial to aberration correction and image quality improvement.

A focal length of the second lens L2 is defined as f2, and the camera optical lens 10 satisfies a condition of $-2.10 \leq f2/f \leq -1.00$, which specifies a ratio of the focal length f2 of the second lens L2 and the focal length f of the camera optical lens 10, within this range, it is beneficial to improve the performance of the camera optical lens.

A curvature radius of an object-side surface of the fifth lens L5 is defined as R9, a curvature radius of an image-side surface of the fifth lens L5 is defined as R10, and the camera optical lens 10 satisfies a condition of $-3.00 \leq R10/R9 \leq -1.00$, which stipulates a shape of the fifth lens L5. Within this range, a degree of deflection of light passing through the lens can be alleviated, and aberrations can be reduced effectively.

In the embodiment, the object-side surface of the first lens L1 is convex in a paraxial region, and an image-side surface of the first lens L1 is convex in the paraxial region.

A curvature radius of the object-side surface of the first lens L1 is defined as R1, a curvature radius of the image-side surface of the first lens L1 is defined as R2, and the camera optical lens 10 satisfies a condition of $-1.01 \leq (R1+R2)/(R1-R2) \leq 0.27$. By reasonably controlling a shape of the first lens L1, which can effectively correct a spherical aberration of the system. Preferably, the camera optical lens 10 further satisfies a condition of $-0.63 \leq 0R1+R2)/(R1-R2)e0.21$.

An on-axis thickness of the first lens L1 is defined as d1, and the camera optical lens 10 satisfies a condition of $0.03 \leq d1/TTL \leq 0.10$. Within this range, it is beneficial to achieve ultra-thin. Preferably, the camera optical lens 10 further satisfies a condition of $0.05 \leq d1/TTL \leq 0.08$.

In the embodiment, an object-side surface of the second lens L2 is convex in the paraxial region, and an image-side surface of the second lens L2 is concave in the paraxial region.

A curvature radius of the object-side surface of the second lens L2 is defined as R3, a curvature radius of the image-side surface of the second lens L2 is defined as R4, and the camera optical lens 10 satisfies a condition of $1.60 \leq (R3+R4)/(R3-R4) \leq 6.07$, which stipulates a shape of the second lens L2. Within this range, a development towards ultra-thin and a wide angle lenses would facilitate correcting a problem of an on-axis aberration. Preferably, the camera optical lens 10 further satisfies a condition of 2.56≤(R3+R4)/(R3−R4)≤4.86.

An on-axis thickness of the second lens L2 is defined as d3, and the camera optical lens 10 satisfies a condition of 0.01≤d3/TTL≤0.05. Within this range, it is beneficial to achieve ultra-thin. Preferably, the camera optical lens 10 further satisfies a condition of 0.02≤d3/TTL≤0.04.

In the embodiment, an object-side surface of the third lens L3 is concave in the paraxial region, and an image-side surface of the third lens L3 is convex in the paraxial region.

A focal length of the third lens L3 is defined as f3, and the camera optical lens 10 satisfies a condition of −2.50≤f3/f≤20.33. Through a reasonable distribution of the negative power of the third lens L3, which can make the system has a better imaging quality and a lower sensitivity. Preferably, the camera optical lens 10 further satisfies a condition of −1.56≤f3/f≤16.27.

A curvature radius of the image-side surface of the third lens L3 is defined as R5, a curvature radius of the image-side surface of the third lens L3 is defined as R6, and the camera optical lens 10 satisfies a condition of −3.68≤(R5+R6)/(R5−R6)≤17.54, which stipulates a shape of the third lens L3. Within this range, the degree of deflection of light passing through the lens can be alleviated, and aberrations can be reduced effectively. Preferably, the camera optical lens 10 further satisfies a condition of −2.30≤(R5+R6)/(R5−R6)≤14.03.

An on-axis thickness of the third lens L3 is defined as d5, and camera optical lens 10 satisfies a condition of 0.01≤d5/TTL≤0.06. Within this range, it is beneficial to achieve ultra-thin. Preferably, the camera optical lens 10 further satisfies a condition of 0.02≤d5/TTL≤0.05.

In the embodiment, an object-side surface of the fourth lens L4 is convex in the paraxial region, and an image-side surface of the fourth lens L4 is concave in the paraxial region.

A focal length of the fourth lens L4 is defined as f4, and the camera optical lens 10 satisfies a condition of −25.39≤f4/f≤88.25. Through a reasonable distribution of the focal length of the fourth lens L4, which can make the system has a better imaging quality and a lower sensitivity. Preferably, the camera optical lens 10 further satisfies a condition of −15.87≤f4/f≤70.60.

A curvature radius of the object-side surface of the fourth lens L4 is defined as R7, a curvature radius of the image-side surface of the fourth lens L4 is defined as R8, and the camera optical lens 10 satisfies a condition of −354.59≤(R7+R8)/(R7−R8)≤30.09, which stipulates a shape of the fourth lens L4. Within this range, a development towards ultra-thin and a wide angle lenses would facilitate correcting the problem of the off-axis aberration. Preferably, the camera optical lens 10 further satisfies a condition of −221.62≤2R7+R8)/(R7−R8)e24.07.

A curvature radius of the object-side surface of the fourth lens L4 is d7, and the camera optical lens 10 satisfies a condition of 0.01≤d7/TTL≤0.05. Within this range, it is beneficial to achieve ultra-thin. Preferably, the camera optical lens 10 further satisfies a condition of 0.02≤d7/TTL≤0.04.

In the embodiment, an object-side surface of the fifth lens L5 is convex in the paraxial region, and an image-side surface of the fifth lens L5 is convex in the paraxial region.

A focal length of the fifth lens L5 is defined as f5, and the camera optical lens 10 satisfies a condition of 0.37≤f5/f≤1.40. The limitation of the fifth lens L5 can effectively make a light angle of the camera optical lens smooth and reduce a tolerance sensitivity. Preferably, the camera optical lens 10 further satisfies a condition of 0.59≤f5/f≤1.12.

A curvature radius of the object-side surface of the fifth lens L5 is defined as R9, a curvature radius of the image-side surface of the fifth lens L5 is defined as R10, and the camera optical lens 10 satisfies a condition of −0.98≤(R9+R10)/(R9−R10)≤−0.02, which stipulates a shape of the fifth lens L5. Within this range, a development towards ultra-thin and a wide angle lenses would facilitate correcting the problem of the off-axis aberration. Preferably, the camera optical lens 10 further satisfies a condition of (R9+R10)/(R9−R10)≤−0.02.

An on-axis thickness of the fifth lens L5 is defined as d9, and the camera optical lens 10 satisfies a condition of 0.02≤d9/TTL≤0.11. Within this range, it is beneficial to achieve ultra-thin. Preferably, the camera optical lens 10 further satisfies a condition of 0.04≤d9/TTL≤0.09.

In the embodiment, an object-side surface of the sixth lens L6 is concave in the paraxial region, and an image-side surface of the sixth lens L6 is concave in the paraxial region.

A focal length of the sixth lens L6 is defined as f6, and the camera optical lens 10 satisfies a condition of −1.82≤f6/f≤−0.50. Through a reasonable distribution of the focal length of the sixth lens L6, which can make the system has a better imaging quality and a lower sensitivity. Preferably, the camera optical lens 10 further satisfies a condition of −1.14≤f6/f≤−0.63.

A curvature radius of the object-side surface of the sixth lens L6 is defined as R11, a curvature radius of the image-side surface of the sixth lens L6 is defined as R12, and the camera optical lens 10 satisfies a condition of −0.35≤(R11+R12)/(R11−R12)≤0.47, which stipulates a shape of the sixth lens L6. Within this range, a development towards ultra-thin and a wide angle lenses would facilitate correcting the problem of the off-axis aberration. Preferably, the camera optical lens 10 further satisfies a condition of −0.22≤(R11+R12)/(R11−R12)≤0.38.

An on-axis thickness of the sixth lens L6 is defined as d11, and the camera optical lens 10 satisfies a condition of 0.08≤d11/TTL≤0.31, within this range, it is beneficial to achieve ultra-thin. Preferably, the camera optical lens 10 further satisfies a condition of 0.13≤d11/TTL≤0.25.

In the embodiment, an image height of the camera optical lens 10 is defined as IH, and the camera optical lens 10 satisfies a condition of TTL/IH≤1.88, which is beneficial to achieve ultra-thin.

In the embodiment, an F number (FNO) of the camera optical lens 10 satisfies a condition of FNO≤2.25, thus achieving a wide aperture.

In the embodiment, an field of view (FOV) the camera optical lens 10 is greater than or equal to 64.00°, thus achieving a wide angle. In the embodiment, a combined focal length of the first lens L1 and the second lens L2 is defined as f12, and the camera optical lens 10 further satisfies a condition of Within this range, it can eliminate an aberration and a distortion of the camera optical lens and reduce a back focal length of the camera optical lens, thereby maintaining miniaturization of the camera optical lens. Preferably, the camera optical lens further satisfies a condition of 0.62≤f12/f≤5.52.

In addition, in the camera optical lens 10 provided by the present disclosure, the surface of each lens may be designed as an aspheric surface, the aspheric surface can be easily made into a shape except a spherical surface, thereby obtaining more control variables, which can decrease aberration and the number of lenses used, thus can effectively reduce a total length of the camera optical lens 10. In the embodiment, the object-side surface and the image-side surface of each lens are aspherical.

When the focal length of the camera optical lens 10, the focal length of each lens, and the curvature radius of each lens all satisfy the above conditions, which makes the camera optical lens has excellent optical performance, and meanwhile, the camera optical lens also satisfies design requirements of a large aperture, a wide angle and ultra-thin. According to the characteristics of the camera optical lens, it is particularly suitable for mobile phone imaging lens assemblies and WEB imaging lenses composed of high-resolution CCD, CMOS and other imaging elements.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object-side surface of the first lens L1 to the image surface Si of the camera optical lens along the optical axis) in mm.

The F number (FNO) means a ratio of an effective focal length of the camera optical lens to an entrance pupil diameter (ENPD).

Furthermore, inflexion points and/or arrest points can be arranged on the object-side surface and/or the image-side surface of the lens, so as to satisfy the demand for high quality imaging. The description below can be referred for specific implementations.

The design data of the camera optical lens 10 shown in FIG. 1 are described as follows.

Table 1 shows the curvature radius of the object-side surface and the curvature radius of the image-side surface of the first lens L1 to the sixth lens L6, the on-axis thickness of the lens and a distance between two adjacent lenses, a refractive index nd and an Abbe number vd. It should be noted that in the embodiment, the units of R and d are in millimeter (mm).

TABLE 1

| | R | d | | nd | | vd |
|---|---|---|---|---|---|---|
| S1 | ∞ | d0 = −3.680 | | | | |
| R1 | 6.686 | d1 = 0.869 | nd1 | 1.5444 | v1 | 55.82 |
| R2 | −9.310 | d2 = 0.053 | | | | |
| R3 | 7.968 | d3 = 0.370 | nd2 | 1.6400 | v2 | 23.54 |
| R4 | 4.177 | d4 = 0.325 | | | | |
| R5 | −5.506 | d5 = 0.326 | nd3 | 1.5444 | v3 | 55.82 |
| R6 | −18.591 | d6 = 0.030 | | | | |
| R7 | 8.224 | d7 = 0.345 | nd4 | 1.6400 | v4 | 23.54 |
| R8 | 7.443 | d8 = 0.551 | | | | |
| R9 | 7.898 | d9 = 0.881 | nd5 | 1.5444 | v5 | 55.82 |
| R10 | −14.125 | d10 = 6.200 | | | | |
| R11 | −11.627 | d11 = 2.302 | nd6 | 1.5444 | v6 | 55.82 |
| R12 | 10.005 | d12 = 0.789 | | | | |

Herein, meanings of various symbols will be described as follows.

S1: aperture.

R: curvature radius of an optical surface, a central curvature radius for a lens.

R1: curvature radius of the object-side surface of the first lens L1.

R2: curvature radius of the image-side surface of the first lens L1.

R3: curvature radius of the object-side surface of the second lens L2.

R4: curvature radius of the image-side surface of the second lens L2.

R5: curvature radius of the object-side surface of the third lens L3.

R6: curvature radius of the image-side surface of the third lens L3.

R7: curvature radius of the object-side surface of the fourth lens L4.

R8: curvature radius of the image-side surface of the fourth lens L4.

R9: curvature radius of the object-side surface of the fifth lens L5.

R10: curvature radius of the image-side surface of the fifth lens L5.

R11: curvature radius of the object-side surface of the sixth lens L6.

R12: curvature radius of the image-side surface of the sixth lens L6.

d: on-axis thickness of a lens and an on-axis distance between lens.

d0: on-axis distance from the aperture S1 to the object-side surface of the first lens L1.

d1: on-axis thickness of the first lens L1.

d2: on-axis distance from the image-side surface of the first lens L1 to the object-side surface of the second lens L2.

d3: on-axis thickness of the second lens L2.

d4: on-axis distance from the image-side surface of the second lens L2 to the object-side surface of the third lens L3.

d5: on-axis thickness of the third lens L3.

d6: on-axis distance from the image-side surface of the third lens L3 to the object-side surface of the fourth lens L4.

d7: on-axis thickness of the fourth lens L4.

d8: on-axis distance from the image-side surface of the fourth lens L4 to the object-side surface of the fifth lens L5.

d9: on-axis thickness of the fifth lens L5.

d10: on-axis distance from the image-side surface of the fifth lens L5 to the object-side surface of the sixth lens L6.

d11: on-axis thickness of the sixth lens L6.

d12: on-axis distance from the image-side surface of the sixth lens L6 to the image surface Si.

nd: refractive index of a d line.

nd1: refractive index of the d line of the first lens L1.

nd2: refractive index of the d line of the second lens L2.

nd3: refractive index of the d line of the third lens L3.

nd4: refractive index of the d line of the fourth lens L4.

nd5: refractive index of the d line of the fifth lens L5.

nd6: refractive index of the d line of the sixth lens L6.

vd: abbe number.

v1: abbe number of the first lens L1.

v2: abbe number of the second lens L2.

v3: abbe number of the third lens L3.

v4: abbe number of the fourth lens L4.

v5: abbe number of the fifth lens L5.

v6: abbe number of the sixth lens L6.

Table 2 shows aspherical surface data of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −1.3437E+00 | −1.5536E−03 | −2.1814E−04 | −5.2204E−05 | 1.2918E−05 | −2.6322E−06 |
| R2 | −2.9453E+00 | 6.3210E−03 | −1.7179E−03 | 4.2092E−04 | −8.5913E−05 | 1.0250E−05 |
| R3 | −5.3541E+01 | −7.0062E−03 | −1.6288E−03 | 5.7945E−04 | −6.2548E−05 | 4.5028E−08 |
| R4 | −1.2605E+01 | −7.0590E−03 | −4.0186E−04 | 2.4459E−04 | −4.8338E−05 | 1.1826E−05 |
| R5 | 3.0483E−01 | 3.8612E−02 | −9.8656E−03 | 2.6323E−03 | −6.2004E−04 | 1.0376E−04 |
| R6 | −1.0500E+02 | 2.7458E−02 | −1.2052E−02 | 3.7483E−03 | −8.8959E−04 | 1.4240E−04 |
| R7 | −2.3143E+00 | −1.0860E−02 | 2.3150E−03 | 7.7643E−04 | −3.2449E−04 | 5.7035E−05 |
| R8 | 5.8900E−01 | −1.6647E−02 | 5.6862E−03 | −5.8196E−04 | 7.8285E−05 | −1.5366E−05 |
| R9 | 6.4645E+00 | −7.2346E−03 | 5.7069E−04 | 2.1933E−04 | −7.0607E−05 | 1.2945E−05 |
| R10 | −6.7262E+00 | 2.1573E−03 | −1.8750E−04 | 3.3696E−04 | −1.1731E−04 | 2.9610E−05 |
| R11 | 6.7997E−01 | −4.1925E−03 | 3.3408E−04 | −3.5891E−05 | 2.7299E−06 | −1.1609E−07 |
| R12 | −3.2136E+01 | −1.3375E−03 | 6.5269E−05 | −2.3302E−06 | 3.9282E−08 | −2.4623E−10 |

| | Conic coefficient | Aspheric surface coefficients | | | |
|---|---|---|---|---|---|
| | k | A14 | A16 | A18 | A20 |
| R1 | −1.3437E+00 | 1.6917E−07 | 0.0000E+00 | 0.0000E+00 | 0.0000E+00 |
| R2 | −2.9453E+00 | −7.0759E−07 | 2.3418E−08 | 0.0000E+00 | 0.0000E+00 |
| R3 | −5.3541E+01 | 5.3316E−07 | −3.0860E−08 | 0.0000E+00 | 0.0000E+00 |
| R4 | −1.2605E+01 | −1.6873E−06 | 8.3532E−08 | 0.0000E+00 | 0.0000E+00 |
| R5 | 3.0483E−01 | −9.4894E−06 | 3.3123E−07 | 0.0000E+00 | 0.0000E+00 |
| R6 | −1.0500E+02 | −1.2920E−05 | 4.7713E−07 | 0.0000E+00 | 0.0000E+00 |
| R7 | −2.3143E+00 | −5.6157E−06 | 2.2690E−07 | 0.0000E+00 | 0.0000E+00 |
| R8 | 5.8900E−01 | 1.1650E−06 | −3.3971E−08 | 0.0000E+00 | 0.0000E+00 |
| R9 | 6.4645E+00 | −1.3020E−06 | 3.5595E−08 | 0.0000E+00 | 0.0000E+00 |
| R10 | −6.7262E+00 | −3.7316E−06 | 1.7736E−07 | 0.0000E+00 | 0.0000E+00 |
| R11 | 6.7997E−01 | 2.7001E−09 | −2.6990E−11 | 0.0000E+00 | 0.0000E+00 |
| R12 | −3.2136E+01 | −2.3444E−12 | 6.5758E−14 | −4.1038E−16 | 0.0000E+00 |

Herein, K is a conic coefficient, and A4, A6, A8, A10, A12, A14, A16, A18, and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (3)$$

Herein, x is a vertical distance between a point on an aspheric curve and the optical axis, and y is a depth of the aspheric surface (the vertical distance between the point x from the optical axis on the aspheric surface and a tangent plane tangent to a vertex on the optical axis of the aspheric surface).

For convenience, an aspheric surface of each lens surface uses the aspheric surfaces shown in the above formula (3). However, the present disclosure is not limited to the aspherical polynomials form shown in the formula (3).

Table 3 and Table 4 show design data of inflexion points and arrest points of the camera optical lens 10 according to Embodiment 1 of the present disclosure. Herein P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6. The data in the column named "inflexion point position" refer to vertical distances from inflexion points arranged on each lens surface to the optical axis of the camera optical lens 10. The data in the column named "arrest point position" refer to vertical distances from arrest points arranged on each lens surface to the optical axis of the camera optical lens 10.

TABLE 3

| | Number of inflexion points | Inflexion point position 1 | Inflexion point position 2 |
|---|---|---|---|
| P1R1 | 1 | 1.685 | / |
| P1R2 | 0 | / | / |
| P2R1 | 2 | 0.805 | 2.525 |
| P2R2 | 1 | 1.095 | / |
| P3R1 | 2 | 0.755 | 2.355 |
| P3R2 | 2 | 0.435 | 1.735 |
| P4R1 | 1 | 2.315 | / |
| P4R2 | 1 | 2.275 | / |
| P5R1 | 0 | / | / |
| P5R2 | 1 | 1.275 | / |
| P6R1 | 1 | 4.105 | / |
| P6R2 | 2 | 1.795 | 6.575 |

TABLE 4

| | Number of arrest points | Arrest point position 1 | Arrest point position 2 |
|---|---|---|---|
| P1R1 | 1 | 2.465 | / |
| P1R2 | 0 | / | / |
| P2R1 | 1 | 1.495 | / |
| P2R2 | 0 | / | / |
| P3R1 | 1 | 1.555 | / |
| P3R2 | 2 | 0.825 | 2.275 |
| P4R1 | 0 | / | / |
| P4R2 | 0 | / | / |
| P5R1 | 0 | / | / |
| P5R2 | 1 | 1.885 | / |
| P6R1 | 0 | / | / |
| P6R2 | 1 | 4.065 | / |

Table 17 in the following shows various values of Embodiment 1 and values corresponding to parameters which are specified in the above conditions.

As shown in Table 17, Embodiment 1 satisfies the above conditions.

Figure 2:
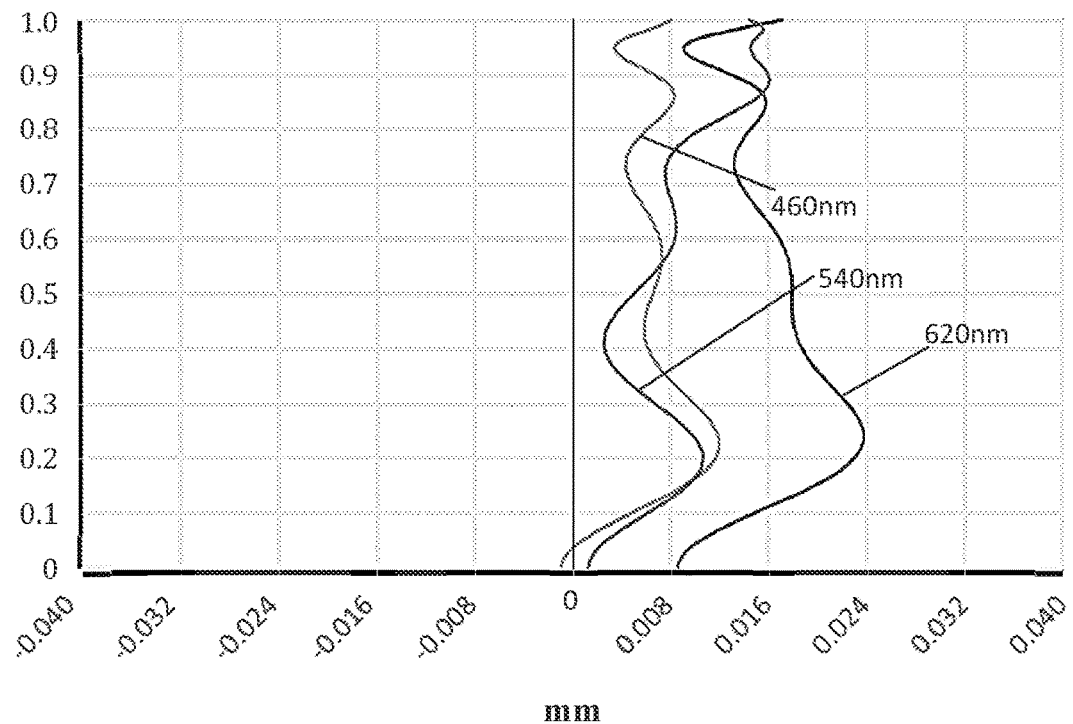
FIG. 2 is a schematic diagram of a longitudinal aberration of the camera optical lens shown in FIG. 1.
Figure 3:
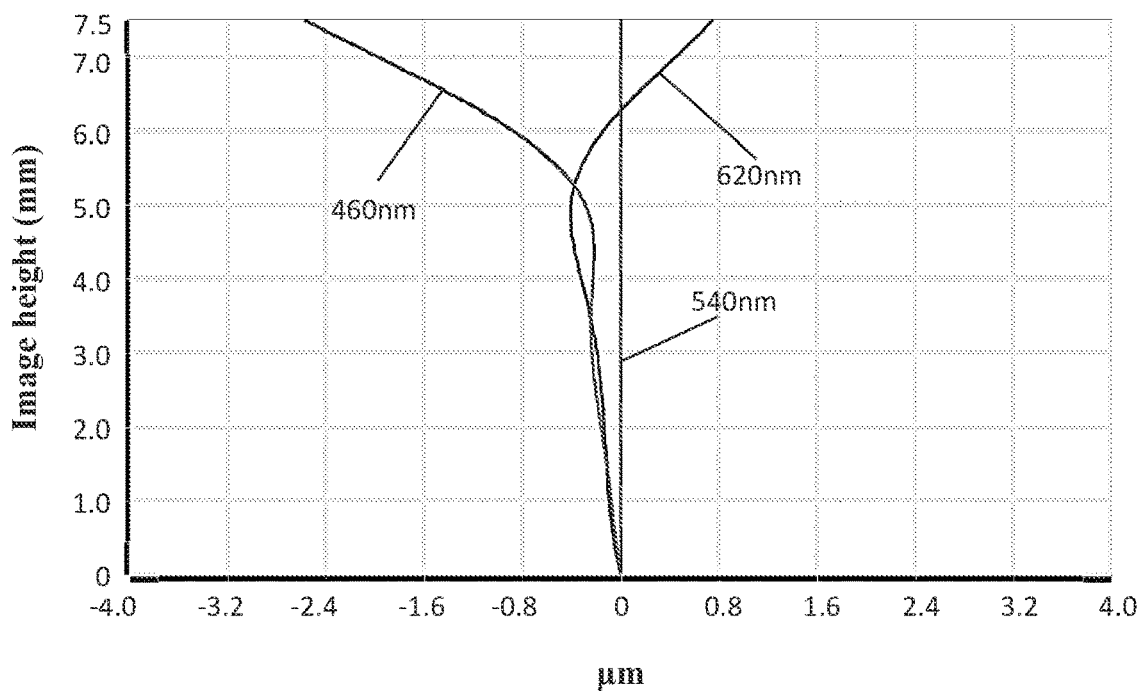
FIG. 3 shows a schematic diagram of a lateral color of the camera optical lens shown in FIG. 1.
Figure 4:
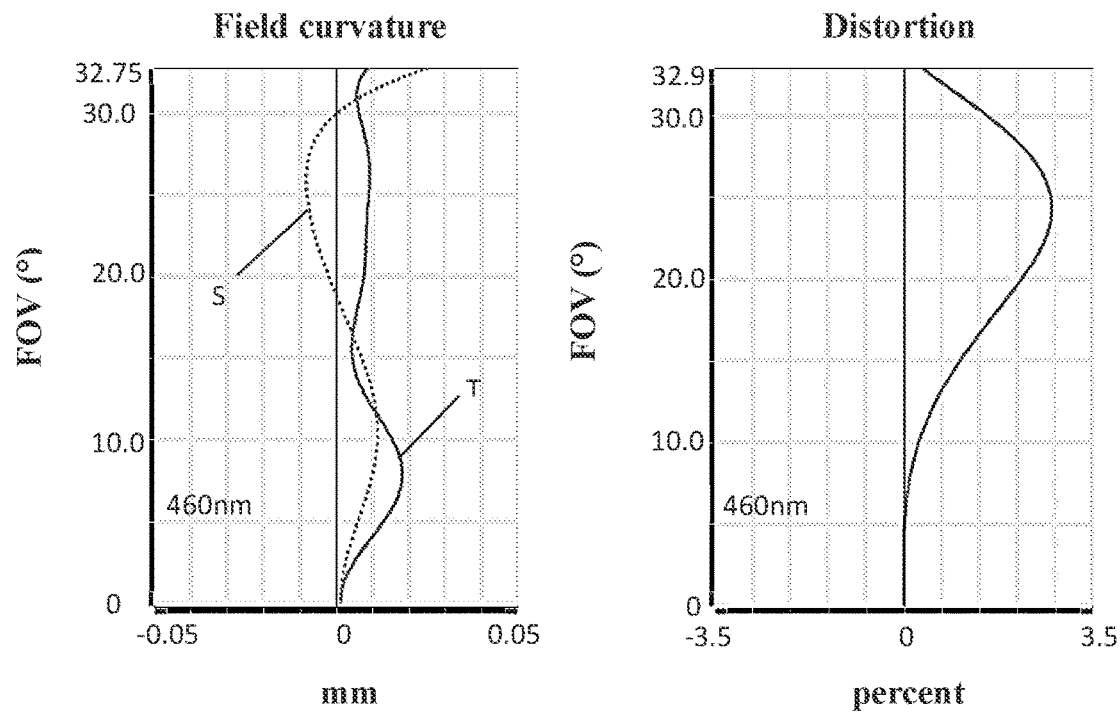
FIG. 4 shows a schematic diagram of a field curvature and a distortion of the camera optical lens shown in FIG. 1.

FIG. 2 and FIG. 3 illustrate a longitudinal aberration and a lateral color with wavelengths of 460 nm, 540 nm and 620 nm after passing the camera optical lens 10 according to Embodiment 1, respectively. FIG. 4 illustrates a field curvature and a distortion with a wavelength of 460 nm after passing the camera optical lens 10 according to Embodiment 1. A field curvature S in FIG. 4 is a field curvature in a sagittal direction, and T is a field curvature in a tangential direction.

In the embodiment, an entrance pupil diameter ENPD of the camera optical lens 10 is 5.200 mm, an image height IH of 1.0 H is 7.500 mm, an FOV (field of view) in a diagonal direction is 65.50°. Thus, the camera optical lens can meet the design requirements of a large aperture, a wide angle and ultra-thin, and its on-axis and off-axis chromatic aberrations are fully corrected, thereby achieving excellent optical characteristics.

Embodiment 2

Figure 5:
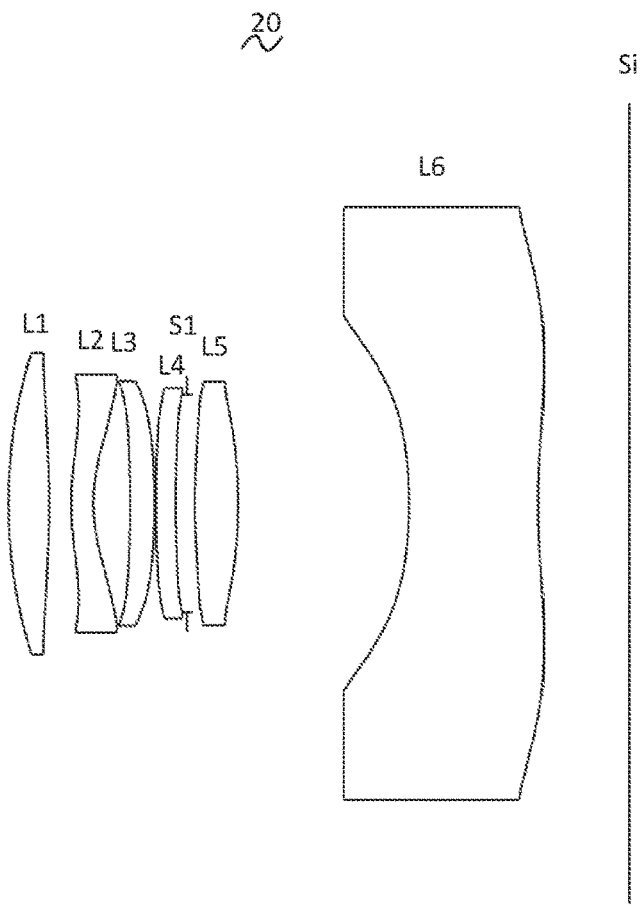
FIG. 5 shows a schematic diagram of a structure of a camera optical lens according to Embodiment 2 of the present disclosure.

FIG. 5 shows a schematic diagram of a structure of a camera optical lens according to Embodiment 2 of the present disclosure. Embodiment 2 is basically the same as Embodiment 1 and involves symbols having the same meanings as Embodiment 1, so the same parts will not be repeated here, and only differences therebetween will be described in the following.

The camera optical lens 20 includes six lenses. Specifically, the camera optical lens 20 includes, from an object side to an image side: a first lens L1, a second lens L2, a third lens L3, a fourth lens L4, an aperture S1, a fifth lens L5, and a sixth lens L6, the sixth lens L6 is spaced apart from an image surface Si.

In the embodiment, the third lens has a positive refractive power.

Table 5 and Table 6 show design data of a camera optical lens 20 in Embodiment 2 of the present disclosure.

TABLE 5

|     | R       | d            | nd  |        | vd |       |
|-----|---------|--------------|-----|--------|----|-------|
| S1  | ∞       | d0 = −3.910  |     |        |    |       |
| R1  | 9.307   | d1 = 0.890   | nd1 | 1.5444 | v1 | 55.82 |
| R2  | −17.651 | d2 = 0.483   |     |        |    |       |
| R3  | 4.784   | d3 = 0.488   | nd2 | 1.6400 | v2 | 23.54 |
| R4  | 2.889   | d4 = 0.811   |     |        |    |       |
| R5  | −16.796 | d5 = 0.536   | nd3 | 1.5444 | v3 | 55.82 |
| R6  | −13.886 | d6 = 0.030   |     |        |    |       |
| R7  | 15.079  | d7 = 0.432   | nd4 | 1.6400 | v4 | 23.54 |
| R8  | 12.828  | d8 = 0.420   |     |        |    |       |
| R9  | 8.898   | d9 = 0.950   | nd5 | 1.5444 | v5 | 55.82 |
| R10 | −9.610  | d10 = 3.739  |     |        |    |       |
| R11 | −8.561  | d11 = 2.835  | nd6 | 1.5444 | v6 | 55.82 |
| R12 | 12.229  | d12 = 1.995  |     |        |    |       |

Table 6 shows aspherical surface data of each lens of the camera optical lens 20 in Embodiment 2 of the present disclosure.

TABLE 6

|     | Conic coefficient | Aspheric surface coefficients | | | | |
|-----|-------------------|------------|------------|------------|------------|------------|
|     | k                 | A4         | A6         | A8         | A10        | A12        |
| R1  | 3.5674E+00        | −6.2307E−05 | −6.7634E−05 | −2.5029E−05 | 1.3043E−05  | −2.8434E−06 |
| R2  | −7.6925E+00       | 3.3416E−03  | −9.4810E−04 | 2.7714E−04  | −5.9260E−05 | 8.8179E−06  |
| R3  | −6.6335E+00       | −9.6600E−03 | −2.4058E−03 | 9.7829E−04  | −1.6670E−04 | 4.1416E−07  |
| R4  | −3.4148E+00       | −5.1549E−03 | −3.2009E−03 | 1.2965E−03  | −2.7891E−04 | 4.7457E−05  |
| R5  | 4.1722E+01        | 1.3243E−02  | −9.3703E−03 | 4.6375E−03  | −1.9817E−03 | 7.0630E−04  |
| R6  | 2.5456E+01        | 1.5418E−03  | −6.4730E−03 | 2.7654E−03  | −2.7124E−04 | −1.5077E−04 |
| R7  | −2.9082E+01       | −1.8229E−02 | 1.3552E−02  | −7.1267E−03 | 3.4905E−03  | −1.2110E−03 |
| R8  | −5.6939E+00       | −2.6903E−02 | 1.8261E−02  | −8.7828E−03 | 3.3605E−03  | −8.8064E−04 |
| R9  | 1.0795E+00        | −1.8362E−03 | 7.1560E−03  | −3.8291E−03 | 1.7977E−03  | −5.8789E−04 |
| R10 | 8.2539E+00        | −2.2777E−03 | 1.0291E−03  | −8.5790E−04 | 5.4347E−04  | −2.0913E−04 |
| R11 | −8.1323E+00       | −7.7315E−03 | 1.8829E−04  | 1.4112E−05  | −4.1405E−06 | 4.8037E−07  |
| R12 | 2.3764E+00        | −4.3433E−03 | 1.8399E−04  | −8.1697E−06 | 2.4346E−07  | −3.9072E−09 |

|     | Conic coefficient | Aspheric surface coefficients | | | |
|-----|-------------------|------------|------------|------------|------------|
|     | k                 | A14        | A16        | A18        | A20        |
| R1  | 3.5674E+00        | 3.5904E−07  | −2.6728E−08 | 1.0750E−09  | −1.7743E−11 |
| R2  | −7.6925E+00       | −8.8378E−07 | 5.6958E−08  | −2.1441E−09 | 3.6171E−11  |
| R3  | −6.6335E+00       | 6.4351E−06  | −1.3772E−06 | 1.2889E−07  | −4.7476E−09 |
| R4  | −3.4148E+00       | −8.0342E−06 | 1.0487E−06  | −6.6185E−08 | 9.6822E−10  |
| R5  | 4.1722E+01        | −1.8216E−04 | 2.9243E−05  | −2.5470E−06 | 9.1366E−08  |
| R6  | 2.5456E+01        | 5.4028E−05  | −7.2609E−06 | 4.3145E−07  | −8.7244E−09 |
| R7  | −2.9082E+01       | 2.6363E−04  | −3.4034E−05 | 2.3788E−06  | −6.9562E−08 |
| R8  | −5.6939E+00       | 1.4363E−04  | −1.2860E−05 | 4.6172E−07  | 1.6439E−09  |
| R9  | 1.0795E+00        | 1.2899E−04  | −1.7739E−05 | 1.3835E−06  | −4.7078E−08 |
| R10 | 8.2539E+00        | 5.2841E−05  | −8.2877E−06 | 7.4121E−07  | −2.8727E−08 |
| R11 | −8.1323E+00       | −2.0736E−08 | 2.8488E−10  | 0.0000E+00  | 0.0000E+00  |
| R12 | 2.3764E+00        | 2.9494E−11  | −9.4742E−14 | 7.1991E−17  | 0.0000E+00  |

Table 7 and table 8 show design data of inflexion points and arrest points of each lens of the camera optical lens 20 lens according to Embodiment 2 of the present disclosure.

TABLE 7

|  | Number of inflexion points | Inflexion point position 1 | Inflexion point position 2 |
|---|---|---|---|
| P1R1 | 0 | / | / |
| P1R2 | 1 | 1.985 | / |
| P2R1 | 1 | 1.015 | / |
| P2R2 | 2 | 1.355 | 2.275 |
| P3R1 | 0 | / | / |
| P3R2 | 0 | / | / |
| P4R1 | 0 | / | / |
| P4R2 | 0 | / | / |
| P5R1 | 2 | 1.015 | 1.515 |
| P5R2 | 1 | 1.885 | / |
| P6R1 | 1 | 3.255 | / |
| P6R2 | 2 | 1.445 | 5.075 |

TABLE 8

|  | Number of arrest points | Arrest point position 1 |
|---|---|---|
| P1R1 | 0 | / |
| P1R2 | 0 | / |
| P2R1 | 1 | 1.855 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 1 | 2.345 |
| P6R1 | 0 | / |
| P6R2 | 1 | 2.755 |

Table 17 in the following shows various values of Embodiment 2 and values corresponding to parameters which are specified in the above conditions.

As shown in Table 17, Embodiment 2 satisfies the above conditions.

Figure 6:
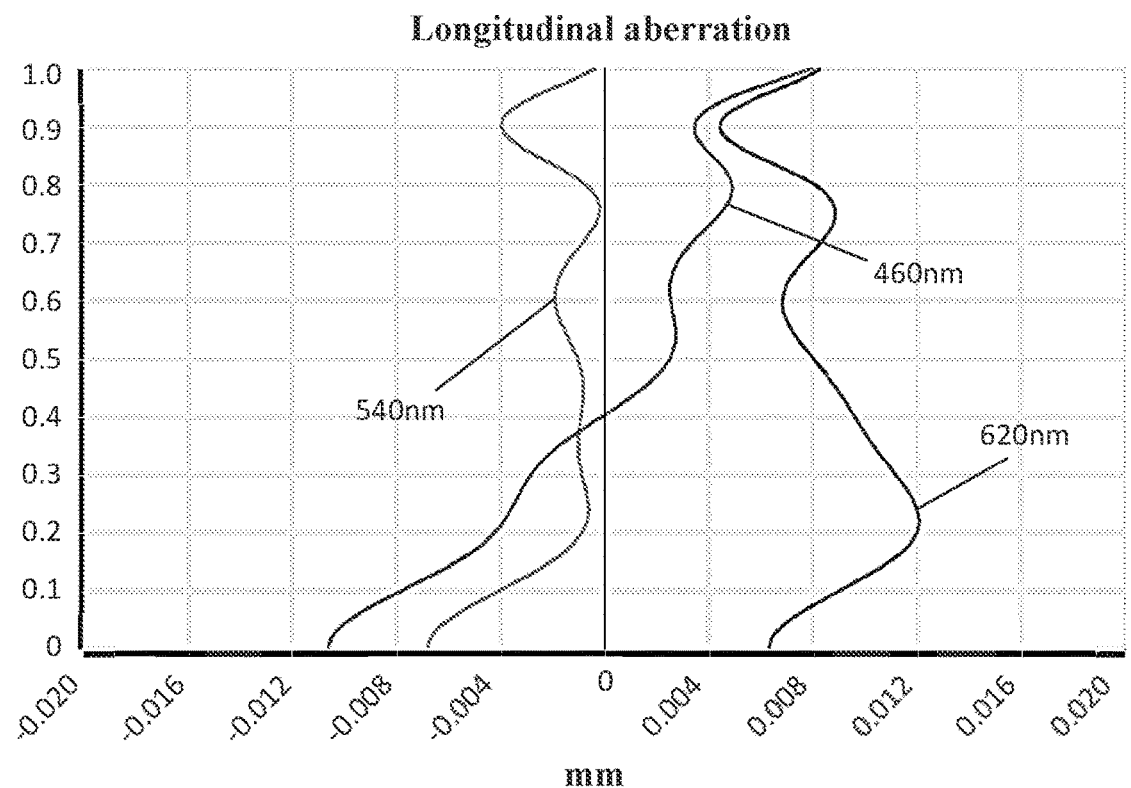
FIG. 6 shows a schematic diagram of a longitudinal aberration of the camera optical lens shown in FIG. 5.
Figure 7:
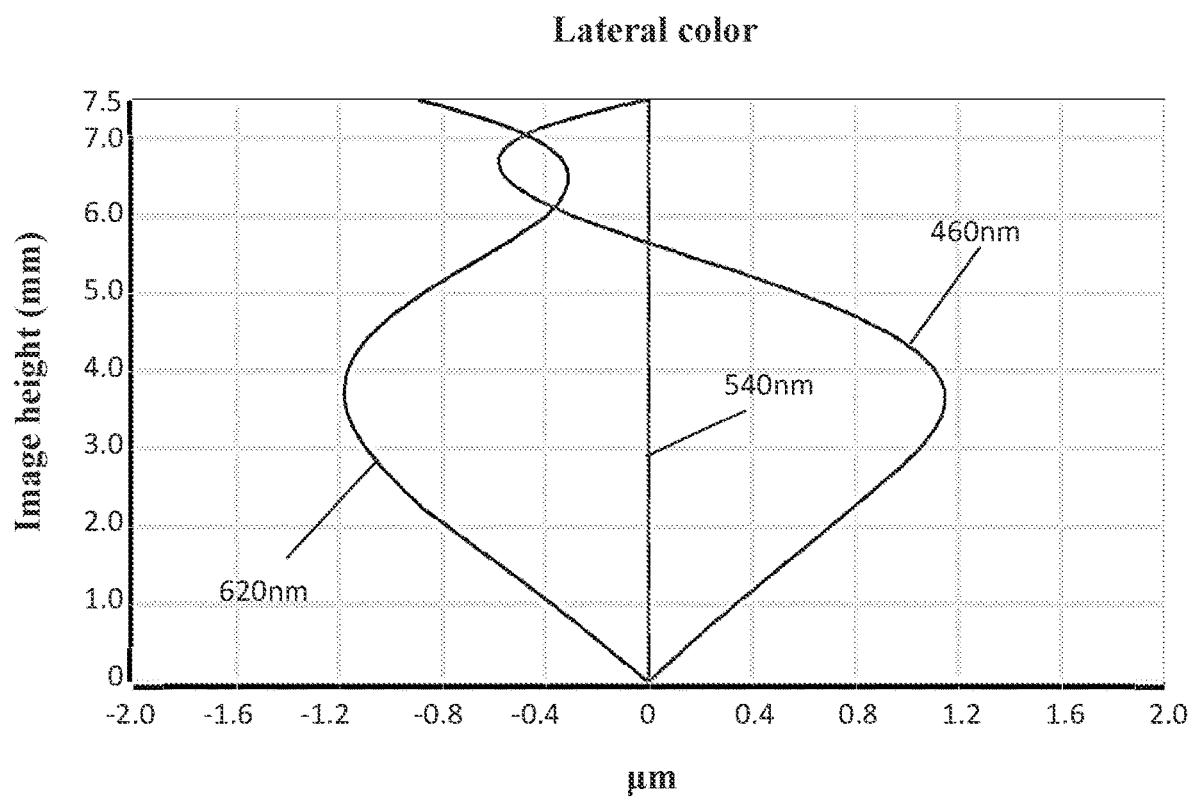
FIG. 7 shows a schematic diagram of a lateral color of the camera optical lens shown in FIG. 5.
Figure 8:
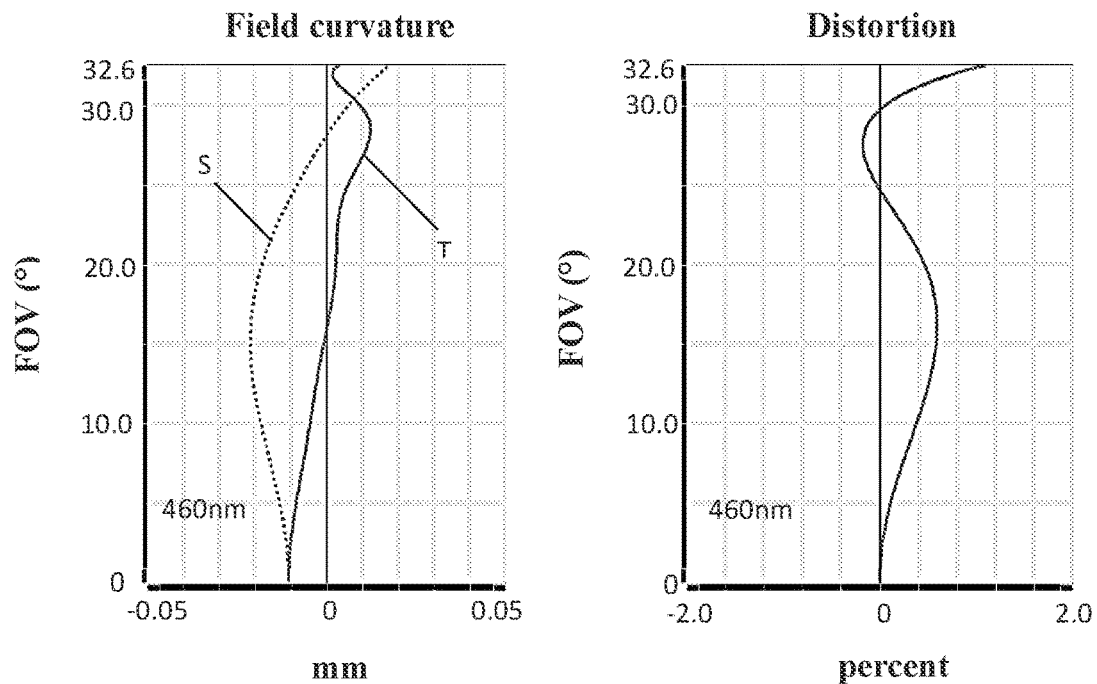
FIG. 8 shows a schematic diagram of a field curvature and a distortion of the camera optical lens shown in FIG. 5.

FIG. 6 and FIG. 7 illustrate a longitudinal aberration and a lateral color with wavelengths of 460 nm, 540 nm and 620 nm after passing the camera optical lens 20 according to Embodiment 2, respectively. FIG. 8 illustrates a field curvature and a distortion with a wavelength of 460 nm after passing the camera optical lens 20 according to Embodiment 2. A field curvature S in FIG. 8 is a field curvature in a sagittal direction, and T is a field curvature in a tangential direction.

In the embodiment, an entrance pupil diameter (ENPD) of the camera optical lens 20 is 5.200 mm, an image height IH of 1.0 H is 7.500 mm, an FOV (field of view) in the diagonal direction is 65.20°. Thus, the camera optical lens can meet the design requirements of a large aperture, a wide angle and ultra-thin, and its on-axis and off-axis chromatic aberrations are fully corrected, thereby achieving excellent optical characteristics.

Embodiment 3

Figure 9:
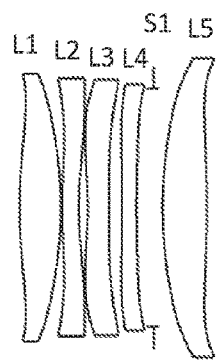
FIG. 9 shows a schematic diagram of a structure of a camera optical lens according to Embodiment 3 of the present disclosure.
Figure 9:
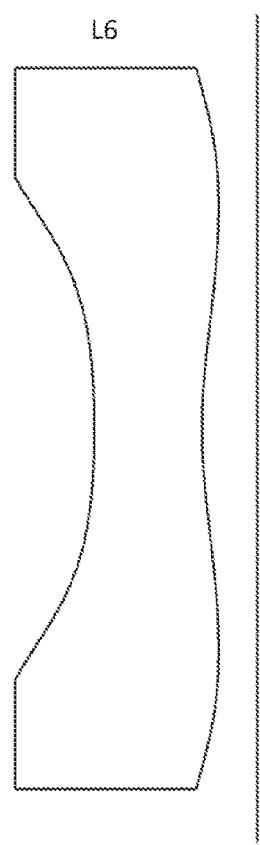

FIG. 9 shows a schematic diagram of a structure of a camera optical lens 30 according to Embodiment 3 of the present disclosure. Embodiment 3 is basically the same as Embodiment 1 and involves symbols having the same meanings as Embodiment 1, so the same parts will not be repeated here, and only differences therebetween will be described in the following.

The camera optical lens 30 includes six lenses. Specifically, the camera optical lens 30 includes, from an object side to an image side: a first lens L1, a second lens L2, a third lens L3, a fourth lens L4, an aperture S1, a fifth lens L5, and a sixth lens L6, the sixth lens L6 is spaced apart from an image surface Si.

In the embodiment, the image-side surface of the third lens L3 is concave in the paraxial region.

Table 9 shows design data of a camera optical lens 30 in Embodiment 3 of the present disclosure.

TABLE 9

|  | R | d | nd | | vd | |
|---|---|---|---|---|---|---|
| S1 | ∞ | d0 = −2.882 | | | | |
| R1 | 8.706 | d1 = 0.888 | nd1 | 1.5444 | v1 | 55.82 |
| R2 | −6.089 | d2 = 0.030 | | | | |
| R3 | 10.203 | d3 = 0.355 | nd2 | 1.6400 | v2 | 23.54 |
| R4 | 6.003 | d4 = 0.191 | | | | |
| R5 | −6.317 | d5 = 0.453 | nd3 | 1.5444 | v3 | 55.82 |
| R6 | 170.295 | d6 = 0.281 | | | | |
| R7 | 156.183 | d7 = 0.320 | nd4 | 1.6400 | v4 | 23.54 |
| R8 | 18.706 | d8 = 0.556 | | | | |
| R9 | 6.605 | d9 = 0.950 | nd5 | 1.5444 | v5 | 55.82 |
| R10 | −19.303 | d10 = 5.778 | | | | |
| R11 | −17.372 | d11 = 2.304 | nd6 | 1.5444 | v6 | 55.82 |
| R12 | 9.034 | d12 = 1.193 | | | | |

Table 10 shows aspherical surface data of each lens of the camera optical lens 30 in Embodiment 3 of the present disclosure.

TABLE 10

|  | Conic coefficient | Aspherical surface coefficients | | | | |
|---|---|---|---|---|---|---|
|  | k | A4 | A6 | A8 | A10 | A12 |
| R1 | −5.9344E+00 | −3.1352E−03 | −4.5357E−04 | −8.4971E−05 | 2.9214E−05 | −1.6505E−06 |
| R2 | −1.9403E+00 | 4.2687E−03 | 3.5287E−04 | −5.9908E−04 | 1.9188E−04 | −4.0253E−05 |
| R3 | −9.9000E+01 | −7.2129E−03 | −3.5201E−03 | 2.8003E−03 | −1.1862E−03 | 2.9998E−04 |
| R4 | −1.9725E+01 | −7.5772E−03 | −1.9624E−03 | 1.2612E−03 | −4.0339E−04 | 9.1719E−05 |
| R5 | −1.3091E+00 | 3.6851E−02 | −9.2486E−03 | 2.1527E−03 | −2.6708E−04 | 1.8550E−05 |
| R6 | 9.9000E+01 | 1.6275E−02 | −5.3941E−03 | 1.7004E−03 | −4.2331E−04 | 7.7239E−05 |
| R7 | 9.9000E+01 | −1.7670E−02 | −3.3323E−03 | 1.1451E−02 | 6.1135E−04 | −6.4473E−05 |
| R8 | −1.5287E+01 | −2.0348E−02 | 1.2031E−02 | −3.4794E−03 | 6.9581E−04 | −9.3342E−05 |
| R9 | 3.6999E+00 | −9.8456E−03 | 2.4054E−03 | −4.6384E−04 | 7.6136E−05 | −9.2375E−06 |
| R10 | 9.1187E+00 | 1.8761E−03 | 5.3112E−06 | 1.9787E−04 | −4.9621E−05 | 8.8157E−06 |
| R11 | 5.5064E+00 | −4.4040E−03 | 1.8296E−04 | −1.2216E−05 | 9.0748E−07 | −4.1157E−08 |
| R12 | −8.8000E+00 | −2.4424E−03 | 1.6100E−04 | −1.0754E−05 | 5.6414E−07 | −2.1487E−08 |

TABLE 10-continued

|  | Conic coefficient | Aspherical surface coefficients | | | |
|---|---|---|---|---|---|
|  | k | A14 | A16 | A18 | A20 |
| R1 | −5.9344E+00 | −1.2800E−06 | 3.3265E−07 | −3.2807E−08 | 1.2010E−09 |
| R2 | −1.9403E+00 | 5.6241E−06 | −4.9339E−07 | 2.4078E−08 | −4.8773E−10 |
| R3 | −9.9000E+01 | −4.4813E−05 | 3.8424E−06 | −1.7050E−07 | 2.8497E−09 |
| R4 | −1.9725E+01 | −1.3515E−05 | 1.1821E−06 | −5.5099E−08 | 1.0818E−09 |
| R5 | −1.3091E+00 | −4.3274E−06 | 1.1868E−06 | −1.4133E−07 | 6.1522E−09 |
| R6 | 9.9000E+01 | −8.6607E−06 | 4.0763E−07 | 0.0000E+00 | 0.0000E+00 |
| R7 | 9.9000E+01 | 3.0928E−06 | −2.4798E−08 | 0.0000E+00 | 0.0000E+00 |
| R8 | −1.5287E+01 | 7.4144E−06 | −2.5192E−07 | 0.0000E+00 | 0.0000E+00 |
| R9 | 3.6999E+00 | 7.2515E−07 | −3.2363E−08 | 2.5296E−10 | −2.8164E−21 |
| R10 | 9.1187E+00 | −7.9900E−07 | 2.6721E−08 | 0.0000E+00 | 0.0000E+00 |
| R11 | 5.5064E+00 | 1.1930E−09 | −1.5905E−11 | 0.0000E+00 | 0.0000E+00 |
| R12 | −8.8000E+00 | 5.5715E−10 | −9.2535E−12 | 8.8975E−14 | −3.7642E−16 |

Table 11 and Table 12 show design data inflexion points and arrest points of the respective lenses in the camera optical lens 30 according to Embodiment 3 of the present disclosure.

TABLE 11

|  | Number of inflexion points | Inflexion point position 1 | Inflexion point position 2 |
|---|---|---|---|
| P1R1 | 1 | 1.255 | / |
| P1R2 | 0 | / | / |
| P2R1 | 2 | 0.705 | 2.425 |
| P2R2 | 2 | 0.945 | 2.205 |
| P3R1 | 1 | 0.685 | / |
| P3R2 | 1 | 2.165 | / |
| P4R1 | 2 | 0.185 | 1.015 |
| P4R2 | 2 | 0.665 | 0.775 |
| P5R1 | 0 | / | / |
| P5R2 | 1 | 1.225 | / |
| P6R1 | 1 | 4.135 | / |
| P6R2 | 2 | 2.005 | 6.385 |

TABLE 12

|  | Number of arrest points | Arrest point position 1 | Arrest point position 2 |
|---|---|---|---|
| P1R1 | 1 | 2.005 | / |
| P1R2 | 0 | / | / |
| P2R1 | 1 | 1.305 | / |
| P2R2 | 2 | 2.025 | 2.345 |
| P3R1 | 1 | 1.315 | / |
| P3R2 | 0 | / | / |
| P4R1 | 2 | 0.315 | 1.385 |
| P4R2 | 0 | / | / |
| P5R1 | 0 | / | / |
| P5R2 | 1 | 1.835 | / |
| P6R1 | 0 | / | / |
| P6R2 | 1 | 4.185 | / |

Table 17 in the following shows various values of Embodiment 3 and values corresponding to parameters which are specified in the above conditions.

As shown in Table 17, Embodiment 3 satisfies the above conditions.

Figure 10:
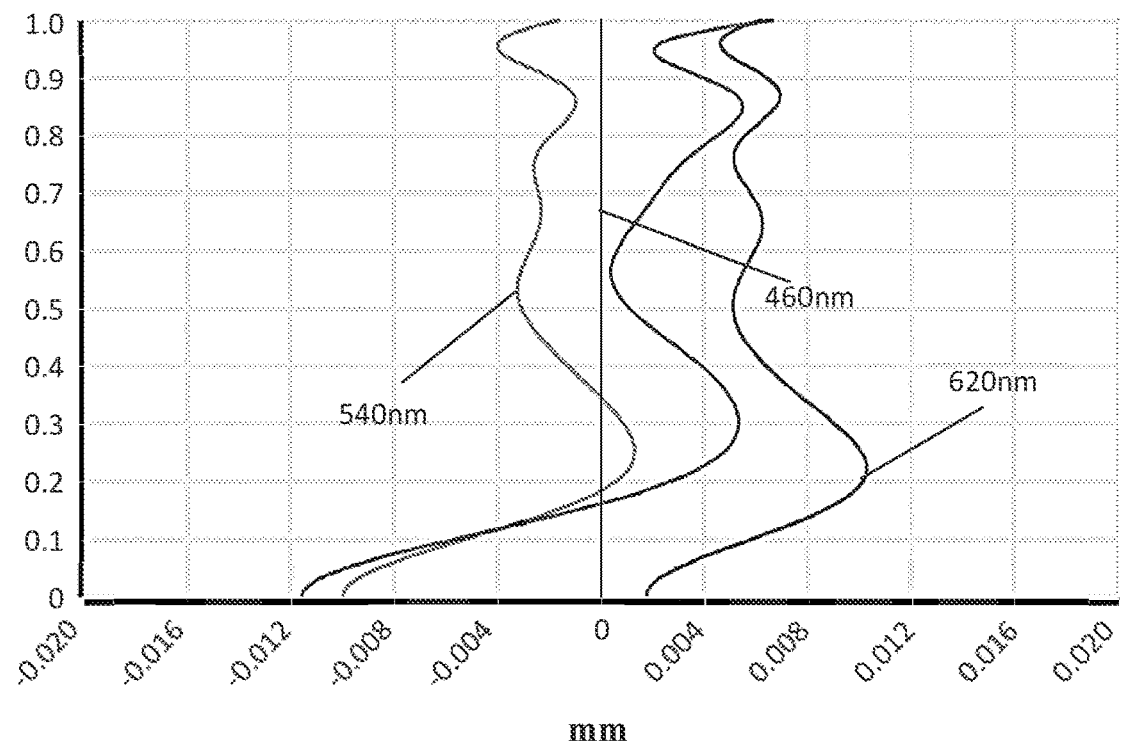
FIG. 10 shows a schematic diagram of a longitudinal aberration of the camera optical lens shown in FIG. 9.
Figure 11:
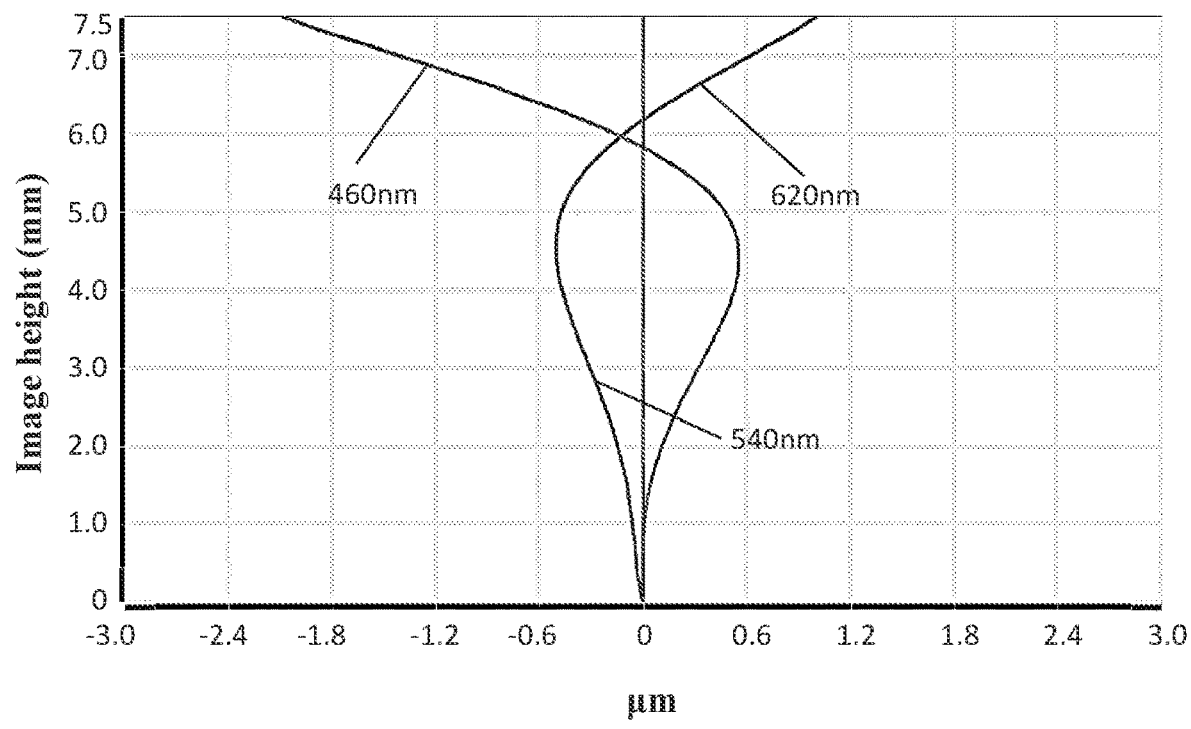
FIG. 11 shows a schematic diagram of a lateral color of the camera optical lens shown in FIG. 9.
Figure 12:
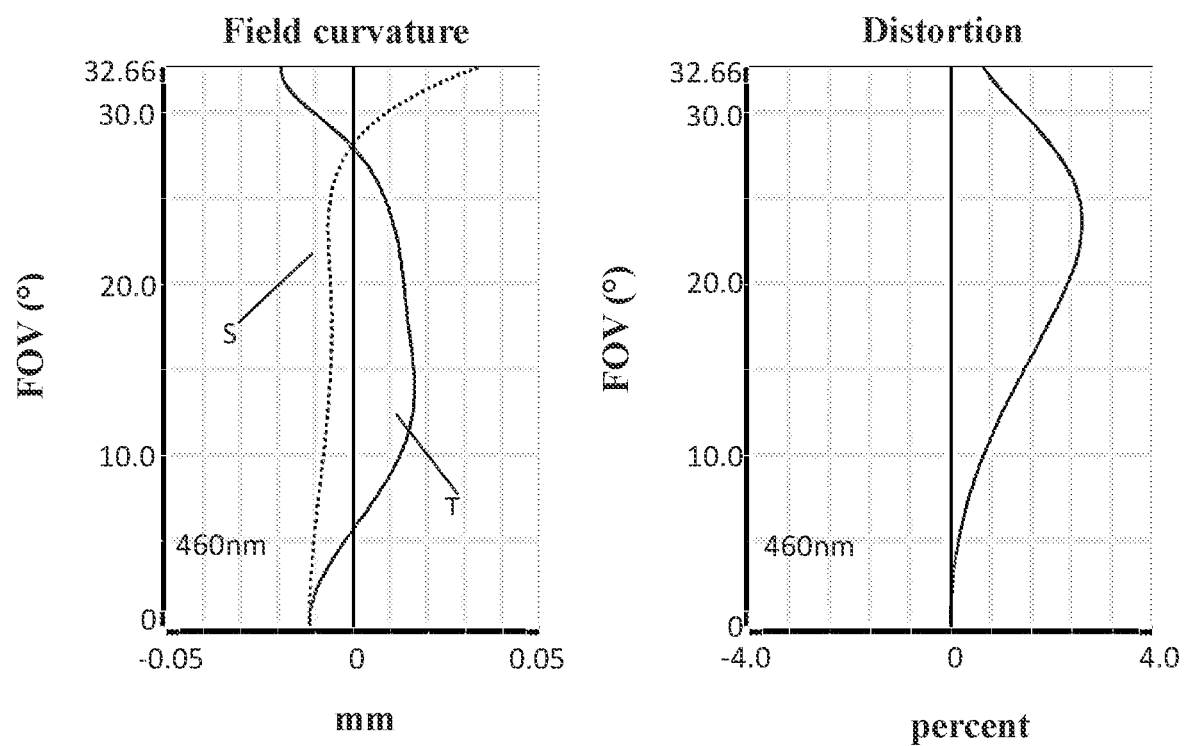
FIG. 12 shows a schematic diagram of a field curvature and a distortion of the camera optical lens shown in FIG. 9.

FIG. 10 and FIG. 11 illustrate a longitudinal aberration and a lateral color of light with wavelengths of 460 nm, 540 nm and 620 nm after passing the camera optical lens 30 according to Embodiment 3. FIG. 12 illustrates a field curvature and a distortion of light with a wavelength of 460 nm after passing the camera optical lens 30 according to Embodiment 3.

In the embodiment, an entrance pupil diameter (ENPD) of the camera optical lens 30 is 5.200 mm, an image height IH of 1.0 H is 7.500 mm, an FOV (field of view) in the diagonal direction is 65.32°. The camera optical lens can meet the design requirements of a large aperture, a wide angle and ultra-thin, and its on-axis and off-axis chromatic aberrations are fully corrected, thereby achieving excellent optical characteristics.

Embodiment 4

Figure 13:
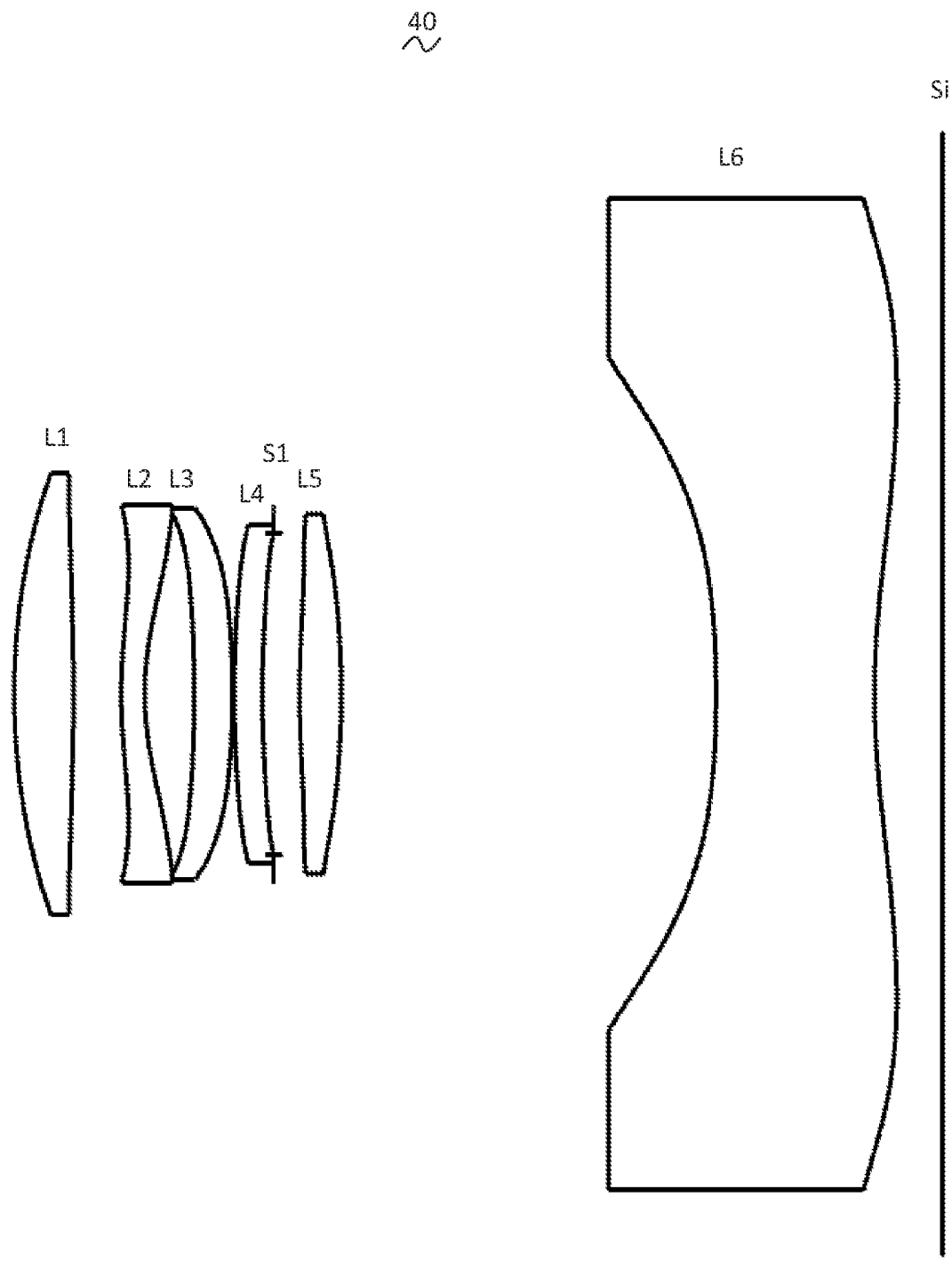
FIG. 13 shows a schematic diagram of a structure of a camera optical lens according to Embodiment 4 of the present disclosure.

FIG. 13 shows a schematic diagram of a structure of a camera optical lens according to Embodiment 4 of the present disclosure. Embodiment 4 is basically the same as Embodiment 1 and involves symbols having the same meanings as Embodiment 1, so the same parts will not be repeated here, and only differences therebetween will be described in the following.

The camera optical lens 40 includes six lenses. Specifically, the camera optical lens 40 includes, from an object side to an image side: a first lens L1, a second lens L2, a third lens L3, a fourth lens L4, an aperture S1, a fifth lens L5, and a sixth lens L6, the sixth lens L6 is spaced apart from an image surface Si.

In the embodiment, the third lens has a negative refractive power, the fourth lens has a negative refractive power.

Table 13 shows design data of a camera optical lens 40 in Embodiment 3 of the present disclosure.

TABLE 13

|  | R | d | nd | | vd | |
|---|---|---|---|---|---|---|
| S1 | ∞ | d0 = −3.892 | | | | |
| R1 | 8.306 | d1 = 0.890 | nd1 | 1.5444 | v1 | 55.82 |
| R2 | −25.146 | d2 = 0.718 | | | | |
| R3 | 6.706 | d3 = 0.350 | nd2 | 1.6400 | v2 | 23.54 |
| R4 | 3.606 | d4 = 0.740 | | | | |
| R5 | −17.280 | d5 = 0.570 | nd3 | 1.5444 | v3 | 55.82 |
| R6 | −14.557 | d6 = 0.030 | | | | |
| R7 | 11.371 | d7 = 0.424 | nd4 | 1.6400 | v4 | 23.54 |
| R8 | 11.500 | d8 = 0.558 | | | | |
| R9 | 11.460 | d9 = 0.624 | nd5 | 1.5444 | v5 | 55.82 |
| R10 | −12.058 | d10 = 5.623 | | | | |
| R11 | −13.353 | d11 = 2.376 | nd6 | 1.5444 | v6 | 55.82 |
| R12 | 9.605 | d12 = 1.193 | | | | |

Table 14 shows aspherical surface data of each lens of the camera optical lens in Embodiment 4 of the present disclosure.

TABLE 14

| | Conic coefficient | Aspheric surface coefficients | | | | |
|---|---|---|---|---|---|---|
| | k | A4 | A6 | A8 | A10 | A12 |
| R1 | 3.1084E+00 | −5.9182E−04 | 1.6412E−05 | −2.9967E−05 | 9.2372E−06 | −1.6765E−06 |
| R2 | −6.5720E+00 | 3.1421E−03 | −5.5803E−04 | 8.5897E−05 | −8.4413E−06 | 1.7716E−07 |
| R3 | −5.9269E+00 | −1.0401E−02 | −5.0886E−04 | −1.6404E−04 | 2.4207E−04 | −9.9605E−05 |
| R4 | −3.4561E+00 | −6.8107E−03 | −7.2057E−04 | −2.3155E−04 | 3.2835E−04 | −1.3165E−04 |
| R5 | 4.2992E+01 | 4.4968E−03 | −3.2943E−03 | 1.1877E−03 | −4.1770E−04 | 1.5888E−04 |
| R6 | 2.7136E+01 | −1.5651E−03 | −7.3109E−03 | 4.4720E−03 | −1.4014E−03 | 2.2433E−04 |
| R7 | −2.2591E+01 | −5.8346E−03 | 6.1115E−04 | 4.7016E−04 | 3.1241E−04 | −3.0958E−04 |
| R8 | 1.3878E+00 | −1.2953E−02 | 6.1871E−03 | −2.8499E−03 | 1.3063E−03 | −4.0878E−04 |
| R9 | −1.0709E+00 | −1.0076E−02 | 1.4902E−03 | −4.1279E−04 | 4.1478E−05 | 4.6956E−05 |
| R10 | 1.1528E+01 | −1.1137E−03 | 4.5159E−04 | −5.7643E−04 | 3.5561E−04 | −1.2818E−04 |
| R11 | −6.5493E+00 | −4.6164E−03 | 1.3537E−04 | −1.1308E−06 | −2.3894E−07 | 2.5291E−08 |
| R12 | −1.6691E+00 | −3.0076E−03 | 1.0178E−04 | −1.8895E−06 | −1.7842E−08 | 1.3526E−09 |

| | Conic coefficient | Aspheric surface coefficients | | | |
|---|---|---|---|---|---|
| | k | A14 | A16 | A18 | A20 |
| R1 | 3.1084E+00 | 1.8541E−07 | −1.2219E−08 | 4.4946E−10 | −7.0513E−12 |
| R2 | −6.5720E+00 | 7.7892E−08 | −1.0541E−08 | 5.7909E−10 | −1.2297E−11 |
| R3 | −5.9269E+00 | 2.3056E−05 | −3.1242E−06 | 2.3029E−07 | −7.1604E−09 |
| R4 | −3.4561E+00 | 2.7903E−05 | −3.2313E−06 | 1.8756E−07 | −4.0365E−09 |
| R5 | 4.2992E+01 | −5.2952E−05 | 1.0896E−05 | −1.1643E−06 | 4.9796E−08 |
| R6 | 2.7136E+01 | −1.3724E−05 | −7.2894E−07 | 1.3682E−07 | −4.7420E−09 |
| R7 | −2.2591E+01 | 9.9435E−05 | −1.5932E−05 | 1.2959E−06 | −4.2850E−08 |
| R8 | 1.3878E+00 | 7.7882E−05 | −8.3655E−06 | 4.4097E−07 | −7.7479E−09 |
| R9 | −1.0709E+00 | −2.3040E−05 | 4.8382E−06 | −4.8982E−07 | 1.9397E−08 |
| R10 | 1.1528E+01 | 2.9880E−05 | −4.3005E−06 | 3.5365E−07 | −1.2704E−08 |
| R11 | −6.5493E+00 | −8.4301E−10 | 9.1646E−12 | 0.0000E+00 | 0.0000E+00 |
| R12 | −1.6691E+00 | −2.0283E−11 | 1.2134E−13 | −2.6240E−16 | 0.0000E+00 |

Table 15 and Table 16 show design data of inflexion points and arrest points of each lens of the camera optical lens 40 lens according to Embodiment 4 of the present disclosure.

TABLE 15

| | Number of inflexion points | Inflexion point position 1 | Inflexion point position 2 |
|---|---|---|---|
| P1R1 | 0 | / | / |
| P1R2 | 1 | 1.535 | / |
| P2R1 | 1 | 0.975 | / |
| P2R2 | 1 | 1.345 | / |
| P3R1 | 0 | / | / |
| P3R2 | 0 | / | / |
| P4R1 | 0 | / | / |
| P4R2 | 0 | / | / |
| P5R1 | 2 | 0.965 | 1.865 |
| P5R2 | 1 | 2.005 | / |
| P6R1 | 1 | 4.085 | / |
| P6R2 | 2 | 1.965 | 6.245 |

TABLE 16

| | Number of arrest points | Arrest point position 1 |
|---|---|---|
| P1R1 | 0 | / |
| P1R2 | 0 | / |
| P2R1 | 1 | 1.715 |
| P2R2 | 0 | / |
| P3R1 | 0 | / |
| P3R2 | 0 | / |
| P4R1 | 0 | / |
| P4R2 | 0 | / |

TABLE 16-continued

| | Number of arrest points | Arrest point position 1 |
|---|---|---|
| P5R1 | 0 | / |
| P5R2 | 0 | / |
| P6R1 | 0 | / |
| P6R2 | 1 | 4.055 |

Table 17 in the following shows various values of Embodiment 4 and values corresponding to parameters which are specified in the above conditions.

Figure 14:
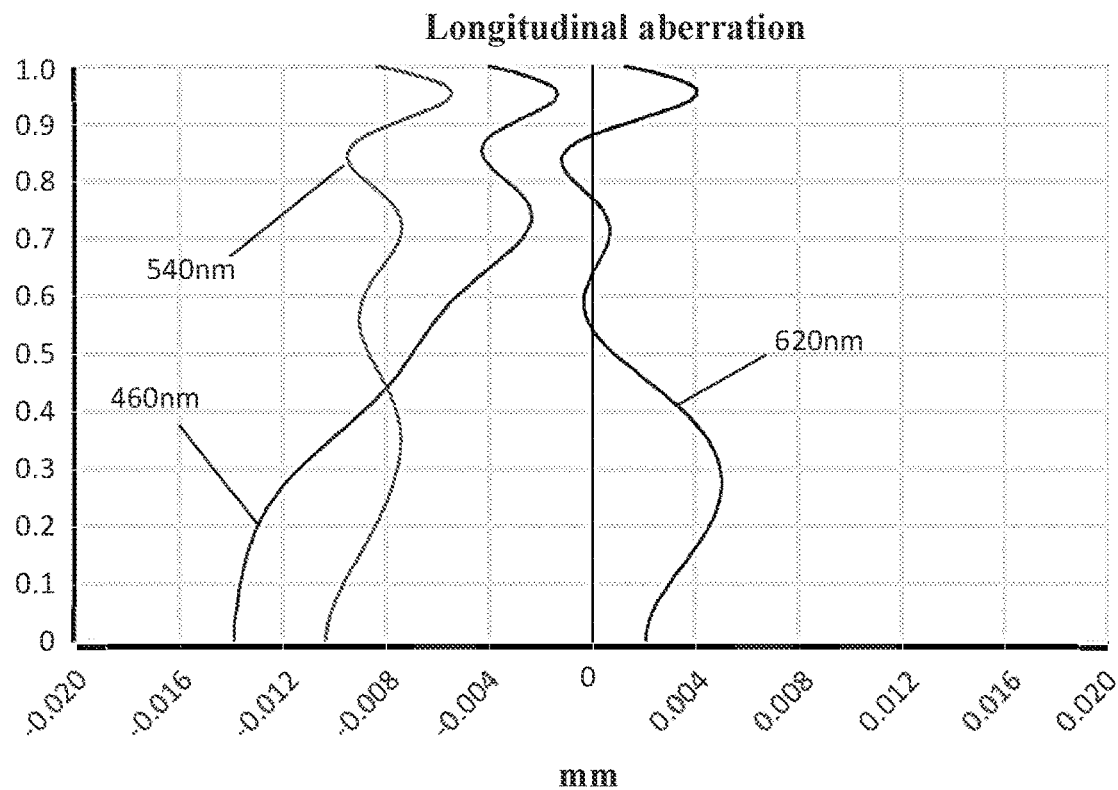
FIG. 14 shows a schematic diagram of a longitudinal aberration of the camera optical lens shown in FIG. 13.
Figure 15:
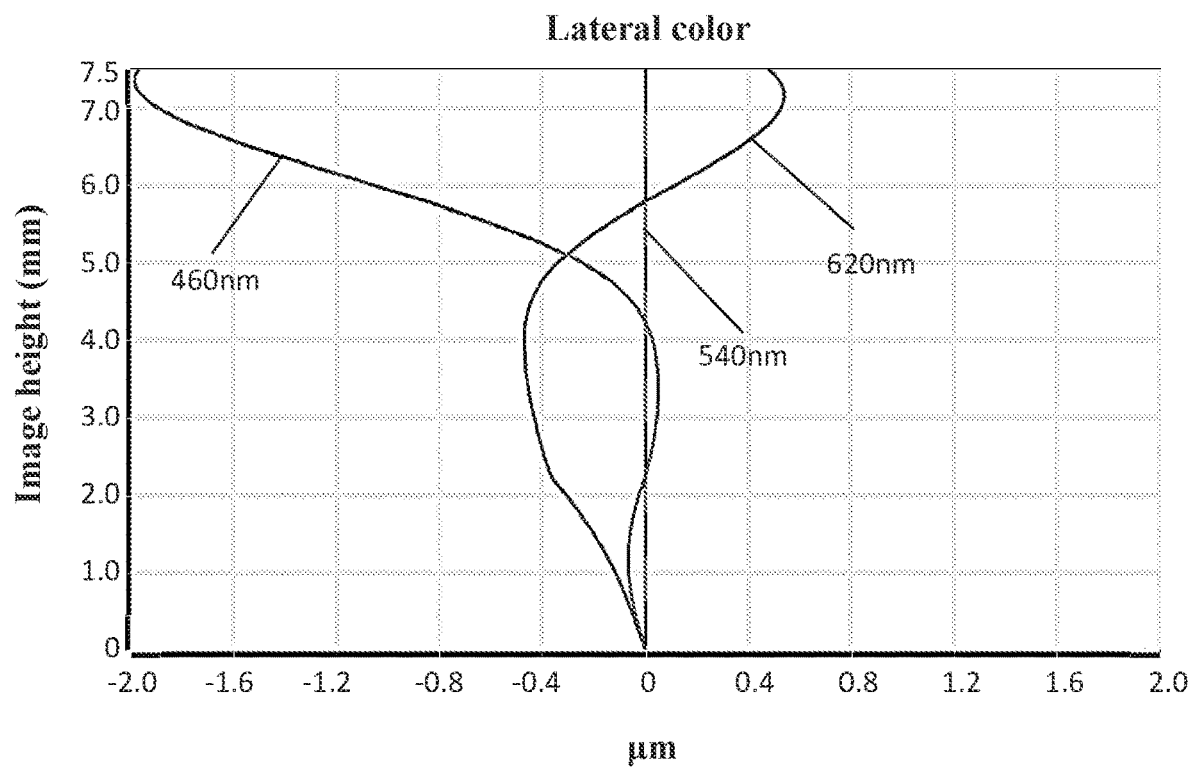
FIG. 15 shows a schematic diagram of a lateral color of the camera optical lens shown in FIG. 13.
Figure 16:
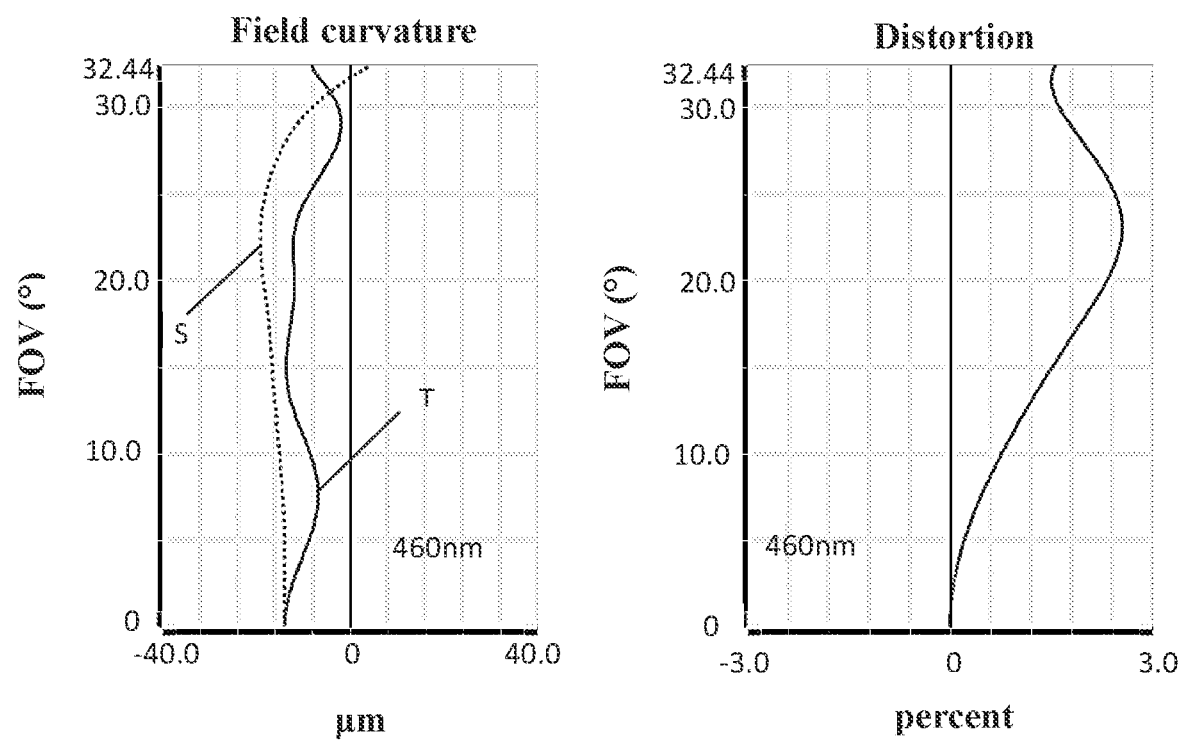
FIG. 16 shows a schematic diagram of a field curvature and a distortion of the camera optical lens shown in FIG. 13.

As shown in Table 17, Embodiment 4 satisfies the above conditions. FIG. 14 and FIG. 15 illustrate a longitudinal aberration and a lateral color of light with wavelengths of 460 nm, 540 nm and 620 nm after passing the camera optical lens 40 according to Embodiment 4. FIG. 16 illustrates a field curvature and a distortion of light with a wavelength of 460 nm after passing the camera optical lens 40 according to Embodiment 4.

In the embodiment, an entrance pupil diameter (ENPD) of the camera optical lens 40 is 5.200 mm, an image height IH of 1.0 H is 7.500 mm, an FOV (field of view) in the diagonal direction is 64.88°. The camera optical lens can meet the design requirements of a large aperture, a wide angle and ultra-thin, and its on-axis and off-axis chromatic aberrations are fully corrected, thereby achieving excellent optical characteristics.

Table 17 in the following shows various values of Embodiment 1, Embodiment 2, Embodiment 3 and Embodiment 4 corresponding to parameters which are specified in the above conditions, as well as other related parameters.

TABLE 17

| Parameters and conditions | Embodiment 1 | Embodiment 2 | Embodiment 3 | Embodiment 4 |
|---|---|---|---|---|
| f | 11.540 | 11.600 | 11.600 | 11.600 |
| f1 | 7.252 | 11.270 | 6.691 | 11.520 |
| f2 | −14.101 | −12.525 | −23.295 | −12.605 |
| f3 | −14.424 | 137.538 | −11.122 | 157.233 |
| f4 | −146.518 | −143.541 | −32.851 | 682.475 |
| f5 | 9.392 | 8.600 | 9.113 | 10.841 |
| f6 | −9.472 | −8.781 | −10.538 | −9.850 |
| f12 | 13.235 | 47.843 | 8.949 | 53.386 |
| FNO | 2.22 | 2.23 | 2.23 | 2.23 |
| TTL | 13.041 | 13.609 | 13.299 | 14.096 |
| IH | 7.500 | 7.500 | 7.500 | 7.500 |
| FOV | 65.50° | 65.20° | 65.32° | 64.88° |
| d10/TTL | 0.48 | 0.27 | 0.43 | 0.40 |
| f1/f | 0.63 | 0.97 | 0.58 | 0.99 |

The above is only illustrates some embodiments of the present disclosure, in practice, one having ordinary skill in the art can make various modifications to these embodiments in forms and details without departing from the scope of the present disclosure.

What is claimed is:

1. A camera optical lens comprising, from an object side to an image side,
   a first lens having a positive refractive power;
   a second lens having a negative refractive power;
   a third lens;
   a fourth lens;
   a fifth lens having a positive refractive power; and
   a sixth lens having a negative refractive power;
   wherein an object-side surface of the second lens is convex in the paraxial region;
   wherein the camera optical lens satisfies the following conditions:
   $0.25 \leq d10/TTL \leq 0.50$;
   $0.55 \leq f1/f \leq 1.00$; and
   $-2.10 \leq f2/f \leq -1.00$;
   where f denotes a focal length of the camera optical lens;
   f1 denotes a focal length of the first lens;
   f2 denotes a focal length of the second lens;
   d10 denotes an on-axis thickness from an image-side surface of the fifth lens to an object-side surface of the sixth lens; and
   TTL denotes a total optical length from an object-side surface of the first lens to an image surface of the camera optical lens along an optical axis.

2. The camera optical lens according to claim 1 further satisfying the following condition: $-3.00 \leq R10/R9 \leq -1.00$;
   where R9 denotes a curvature radius of an object-side surface of the fifth lens; and
   R10 denotes a curvature radius of an image-side surface of the fifth lens.

3. The camera optical lens according to claim 1 further satisfying the following conditions:
   $-1.01 \leq (R1+R2)/(R1-R2) \leq 0.27$; and
   $0.03 \leq d1/TTL \leq 0.10$;
   where R1 denotes a curvature radius of the object-side surface of the first lens;
   R2 denotes a curvature radius of an image-side surface of the first lens; and
   d1 denotes an on-axis thickness of the first lens.

4. The camera optical lens according to claim 1 further satisfying the following conditions:
   $1.60 \leq (R3+R4)/(R3-R4) \leq 6.07$; and
   $0.01 \leq d3/TTL \leq 0.05$;
   where R3 denotes a curvature radius of an object-side surface of the second lens;
   R4 denotes a curvature radius of an image-side surface of the second lens; and
   d3 denotes an on-axis thickness of the second lens.

5. The camera optical lens according to claim 1 further satisfying the following conditions:
   $-2.50 \leq f3/f \leq 20.33$;
   $-3.68 \leq (R5+R6)/(R5-R6) \leq 17.54$; and
   $0.01 \leq d5/TTL \leq 0.06$;
   where f3 denotes a focal length of the third lens;
   R5 denotes a curvature radius of an object-side surface of the third lens;
   R6 denotes a curvature radius of an image-side surface of the third lens; and
   d5 denotes an on-axis thickness of the third lens.

6. The camera optical lens according to claim 1 further satisfying the following conditions:
   $-25.39 \leq f4/f \leq 88.25$;
   $-354.59 \leq (R7+R8)/(R7-R8) \leq 30.09$; and
   where f4 denotes a focal length of the fourth lens;
   R7 denotes a curvature radius of an object-side surface of the fourth lens;
   R8 denotes a curvature radius of an image-side surface of the fourth lens; and
   d7 denotes an on-axis thickness of the fourth lens.

7. The camera optical lens according to claim 1 further satisfying the following conditions:
   $0.37 \leq f5/f \leq 1.40$;
   $-0.98 \leq (R9+R10)/(R9-R10) \leq -0.02$; and
   $0.02 \leq d9/TTL \leq 0.11$;
   where f5 denotes a focal length of the fifth lens;
   R9 denotes a curvature radius of an object-side surface of the fifth lens;
   R10 denotes a curvature radius of an image-side surface of the fifth lens; and
   d9 denotes an on-axis thickness of the fifth lens.

8. The camera optical lens according to claim 1 further satisfying the following conditions:
   $-1.82 \leq f6/f \leq -0.50$;
   $-0.35 \leq (R11+R12)/(R11-R12) \leq 0.47$; and
   where f6 denotes a focal length of the sixth lens;
   R11 denotes a curvature radius of an object-side surface of the sixth lens;
   R12 denotes a curvature radius of an image-side surface of the sixth lens; and
   d11 denotes an on-axis thickness of the sixth lens.

9. The camera optical lens according to claim 1 further satisfying the following condition: $TTL/IH \leq 1.88$;
   where IH denotes an image height of the camera optical lens.

* * * * *